US008458234B2

(12) United States Patent
Hiraiwa et al.

(10) Patent No.: US 8,458,234 B2
(45) Date of Patent: *Jun. 4, 2013

(54) DATA MANAGEMENT METHOD

(75) Inventors: Yuri Hiraiwa, Sagamihara (JP); Hiroshi Nasu, Yokohama (JP); Naoki Utsunomiya, Machida (JP)

(73) Assignee: Hitachi, Ltd., Tokyo (JP)

( * ) Notice: Subject to any disclaimer, the term of this patent is extended or adjusted under 35 U.S.C. 154(b) by 69 days.

This patent is subject to a terminal disclaimer.

(21) Appl. No.: 13/152,310

(22) Filed: Jun. 3, 2011

(65) Prior Publication Data
US 2011/0231459 A1 Sep. 22, 2011

Related U.S. Application Data

(63) Continuation of application No. 12/329,174, filed on Dec. 5, 2008, now Pat. No. 7,979,478.

(30) Foreign Application Priority Data

Aug. 8, 2008 (JP) .................. 2008-205005

(51) Int. Cl.
*G06F 17/30* (2006.01)
(52) U.S. Cl.
USPC .......................................... 707/821; 707/828
(58) Field of Classification Search
USPC ......................................... 707/826, 828, 821
See application file for complete search history.

(56) References Cited

U.S. PATENT DOCUMENTS

| 7,143,146 | B2 | 11/2006 | Nakatani et al. |
| 7,155,466 | B2 | 12/2006 | Rodriguez et al. |
| 7,469,260 | B2 | 12/2008 | Enko et al. |
| 2006/0031653 | A1 | 2/2006 | Todd et al. |
| 2006/0235821 | A1 | 10/2006 | Armangau et al. |
| 2006/0259516 | A1 | 11/2006 | Stakutis et al. |
| 2008/0313236 | A1 | 12/2008 | Vijayakumar et al. |
| 2010/0036872 | A1 | 2/2010 | Hiraiwa et al. |
| 2010/0153665 | A1 | 6/2010 | Todd et al. |
| 2010/0306786 | A1* | 12/2010 | Passey et al. ................. 719/314 |

FOREIGN PATENT DOCUMENTS

WO 03052529 6/2003

* cited by examiner

*Primary Examiner* — Christyann Pulliam
*Assistant Examiner* — Fariborz Khoshnoodi
(74) *Attorney, Agent, or Firm* — Brundidge & Stanger, P.C.

(57) ABSTRACT

A data storage or management method is provided which allows both a content object-based access and a file-based access. A first request for storing a content object in accordance with the processing of an application program executed in a host is sent to an object archive control functionality executed in the host, an intermediate server, or a storage apparatus. The object archive control functionality generates an object identifier corresponding to the content object received in response to the first request, a directory name corresponding to the object identifier, and a plurality of file names corresponding to a plurality of fields contained in the content object. The storage apparatus stores a directory having the directory name and the plurality of files having the plurality of file names in accordance with the second request.

6 Claims, 26 Drawing Sheets

FIG. 2

7300
FIELD MANAGEMENT INFORMATION

| FIELD NAME | ATTRIBUTE | | | | | CONTENT |
| --- | --- | --- | --- | --- | --- | --- |
| | TYPE | BINDING | READ-ONLY | LENGTH | EXPANSION FILE NAME | |
| OBJECT ID | byte | TRUE | TRUE | | | 00 |
| IMAGE1 | jpg | TRUE | TRUE | | | [BINARY DATA] |
| RETENTION PERIOD | double | FALSE | FALSE | | retention.txt | 1/1/2100 |
| OWNER | string | TRUE | FALSE | | | Uer01 |
| HOLD | string | TRUE | FALSE | | | OFF |

FIG. 3

7400
FIELD UPDATE HISTORY INFORMATION

| UPDATE INFORMATION | FIELD NAME | ATTRIBUTE | | | | | CONTENT |
|---|---|---|---|---|---|---|---|
| | | TYPE | BINDING | READ-ONLY | LENGTH | EXPANSION FILE NAME | |
| CREATE | IMAGE2 | | | | | | |
| CREATE | VIDEO1 | | | | | | |
| MODIFY | | | | | | | |
| MODIFY | | | | | | | |
| DELETE | | | | | | | |

1111D — UPDATE INFORMATION
1111A — FIELD NAME
1111B — ATTRIBUTE
1111B1 — TYPE
1111B2 — BINDING
1111B3 — READ-ONLY
1111B4 — LENGTH
1111B5 — EXPANSION FILE NAME
1111C — CONTENT

BEFORE OBJECT CREARE REQUEST IS ISSUED

AFTER COMPLETION OF OBJECT CREARE PROCESS

FIG. 17

FIELD LIST FILE 1112B

| FIELD NAME (1112A) | ATTRIBUTE (1112B) | | | | | POINTER (1112C) |
|---|---|---|---|---|---|---|
| | TYPE | BINDING | READ-ONLY | LENGTH | EXPANSION FILE NAME | |
| OBJECT ID | byte | TRUE | TRUE | | | /fcfs_data/00/id |
| IMAGE1 | jpg | TRUE | TRUE | | | /fcfs_data/00/image1 |
| RETENTION PERIOD | double | FALSE | FALSE | | retention.txt | /fcfs_data/00/retention |
| OWNER | string | TRUE | FALSE | | | /fcfs_data/00/owner |
| HOLD | string | TRUE | FALSE | | | /fcfs_data/00/hold |
| | 1112B1 | 1112B2 | 1112B3 | 1112B4 | 1112B5 | |

1112D (for each field name row)

DATA MANAGEMENT METHOD

CROSS REFERENCES TO RELATED APPLICATIONS

The present application is a continuation of application Ser. No. 12/329,174, filed Dec. 5, 2008, now U.S. Pat. No. 7,979,478; which relates to and claims priority from Japanese Patent Application No. 2008-205005, filed on Aug. 8, 2008, the entire disclosure of which is incorporated herein by reference.

BACKGROUND OF THE INVENTION

1. Field of the Invention

The techniques disclosed in the specification of the present application relate to method, apparatus, system, and program for storing data generated by a client.

2. Description of the Related Art

Among a number of different known methods for archiving data, each method has certain disadvantages. Until recently, archiving with tape has been the most commonly used method for archiving data. However, tape archives are often difficult to access (including read, write, acquire states thereof, and the like) and do not allow quick and easy retrieval of archived data. Because of this, disk arrays have become more common as the archival medium of choice, since they allow archived data to be more quickly and easily accessed. Although the archive usually means long-term preservation, the archive as used in the present specification needs not be interpreted as limiting to the one purposing the long-term preservation but means preservation.

Fixed Content Aware Storage (FCAS) is generally defined by SNIA (Storage Networking Industry Association) as storage of unchanging data (fixed content) and associated metadata based on a variety of naming schemas including Content Addressable Storage (CAS) and global content-independent identifiers. An example thereof includes an eXtensible Access Method (XAM) adopted by the SNIA. In the storage industry, CAS is also sometimes referred to as Content Addressed Storage, Content Aware Storage or Content Archive Storage.

In CAS, the content data to be generated and updated in a client coupled to the CAS is not processed as a standard file but is handled as an object which is composed of content data and metadata (which represents more than one attributes related to the content data). In this specification, when an object clearly shows that it contains the content data, the object is sometimes referred to as an content object. The content data is appended with metadata and is assigned a unique content object identifier known as "object ID." For archiving, the content object is stored to several locations on a hard disk. Then, the client refers to or edits the content data or the metadata of the object archived in the CAS by designating the object ID.

There is known a method in which a so-called NAS (Network Attached Storage) is used in archiving.

In NAS, the client identifies files by the use of a path name composed of a directory name and a file name, management of files, typified by generate, update or delete, is carried out. Moreover, in the NAS, by designating a directory name of a directory in which more than one files are included, it is possible to collectively perform operations to the more than one files included in the designated directory. For this reason, the NAS is sometimes referred to as file storage.

As an example implementation of the file storage used in archiving, U.S. Pat. No. 7,155,466 discloses a storage system and data management method.

SUMMARY OF THE INVENTION

In the above-mentioned CAS, objects are handled as a cluster of more than one content data elements, and an archive request or a reference request is instructed from software or the like on a computer accessing the CAS, with designating them by the object ID.

On the other hand, in the file storage, an archive request or a reference request is instructed with designating a file by the path name. Moreover, a lumped management request is instructed with designating a plurality of files by the directory name.

For this reason, it was difficult to implement a data storage and management method which allows both designation methods.

The present invention provides apparatus, system, method, program, and storage medium for a file-based storage of a content object on an information processing system which includes more than one host and a storage apparatus.

In accordance with one embodiment of the present invention, the method comprises the steps of: sending a first request for storing a content object in accordance with the processing of an application program executed by a first computer; generating an object identifier corresponding to the content object received in response to the first request, a directory name corresponding to the object identifier, and a plurality of file names corresponding to a plurality of fields contained in the content object; sending a second request with designation of the directory name and the plurality of file names; and storing a directory having the directory name and a plurality of files having the plurality of file names in response to the second request.

In the method, a storage destination of the directory and the plurality of files may be a storage system.

The method may further comprise the steps of: sending a third request with designation of one of the plurality of file names to the storage system in accordance with the processing of a file application executed in a second computer; and the storage system sending, in the second computer, a file, which is one of the plurality of files, corresponding to the one of the plurality of file names.

In accordance with another embodiment of the present invention, the method comprises sending a first request to store a content object including a first field containing a content data generated by the processing of an application program executed in a first computer and a second field containing an attribute information of the content data generating an object identifier corresponding to the content object received in response to the first request, a directory name corresponding to the object identifier in accordance with a predetermined rule, a first file name corresponding to an identification information of the first field in accordance with the predetermined rule, and a second file name corresponding to an identification information of the second field in accordance with the predetermined rule sending a second request to create a directory having the directory name, a first file in the directory having the first file name and in which the content data of the first field is included, a second file in the directory having the second file name and in which the attribute information of the second field is included, and a field list file in the directory related to the content object and in which a correspondence between the identification information of the first field and the first file name and a correspondence between the identification information of the second field and the second file name are included, sending the object identifier to the first computer for the application program to designate for reference or update of the content data, and in the directory, storing the first file, the second file, and the field list file in response to the second request.

The method may further comprise sending a third request with designation of the object identifier for editing the content object in accordance with the processing of the application program executed in the first computer, specifying the directory name and the field list file in accordance with the object identifier received in response to the first request and the rule, sending a fourth request to specify the first file name and the second file name in accordance with the field list file to read out data stored in the first file and the second file, and sending the data stored in the first file and the second file in response to the fourth request.

In the method, when either one of the field list file, the first file, or the second file is lost, it may be detected and a message corresponding to the third request may be returned.

In the method, the first file, the second file, and the field list file may be stored in a storage system.

The method may further comprise: sending, to a storage system, a third request with designation of the first file name or the second file name in accordance with the processing of a file application executed in a second computer; the storage system sending, in the second computer, a designated file, which is one of the first file and the second file, in response to receiving the third request. In this case, the file application may refer to the content data preserved in an object manner, extract a backup of the content data, or modify the content data.

In the method, the storage system may store a third file generated by the second computer in the storage system.

In the method, the first file, the second file, and the field list file, corresponding to the content object may be stored in the file system in which the third file is stored. In this case, since the respective files are stored at least directly or hierarchically in the same root directory, by allowing the file application to designate the directory in the data management operation, it is possible to manage, in a lump, the content data and metadata which are stored in an object-based manner and the files which are stored in a file-based manner.

In accordance with the embodiments of the present invention, it is possible to provide a data management method which allows both an object ID-based access request and a path name-based or directory name-based access request.

BRIEF DESCRIPTION OF THE DRAWINGS

FIG. 2 is an explanatory view showing a configuration of an object and a field management information according to the first embodiment of the present invention.

FIG. 3 is an explanatory view showing a configuration of a field update history information according to the first embodiment of the present invention.

FIG. 17 is an explanatory view showing a configuration of a field list file according to the first embodiment of the present invention.

DETAILED DESCRIPTION OF THE INVENTION

Hereinafter, embodiments of the present invention will be described.

Embodiment 1

Figure 1:
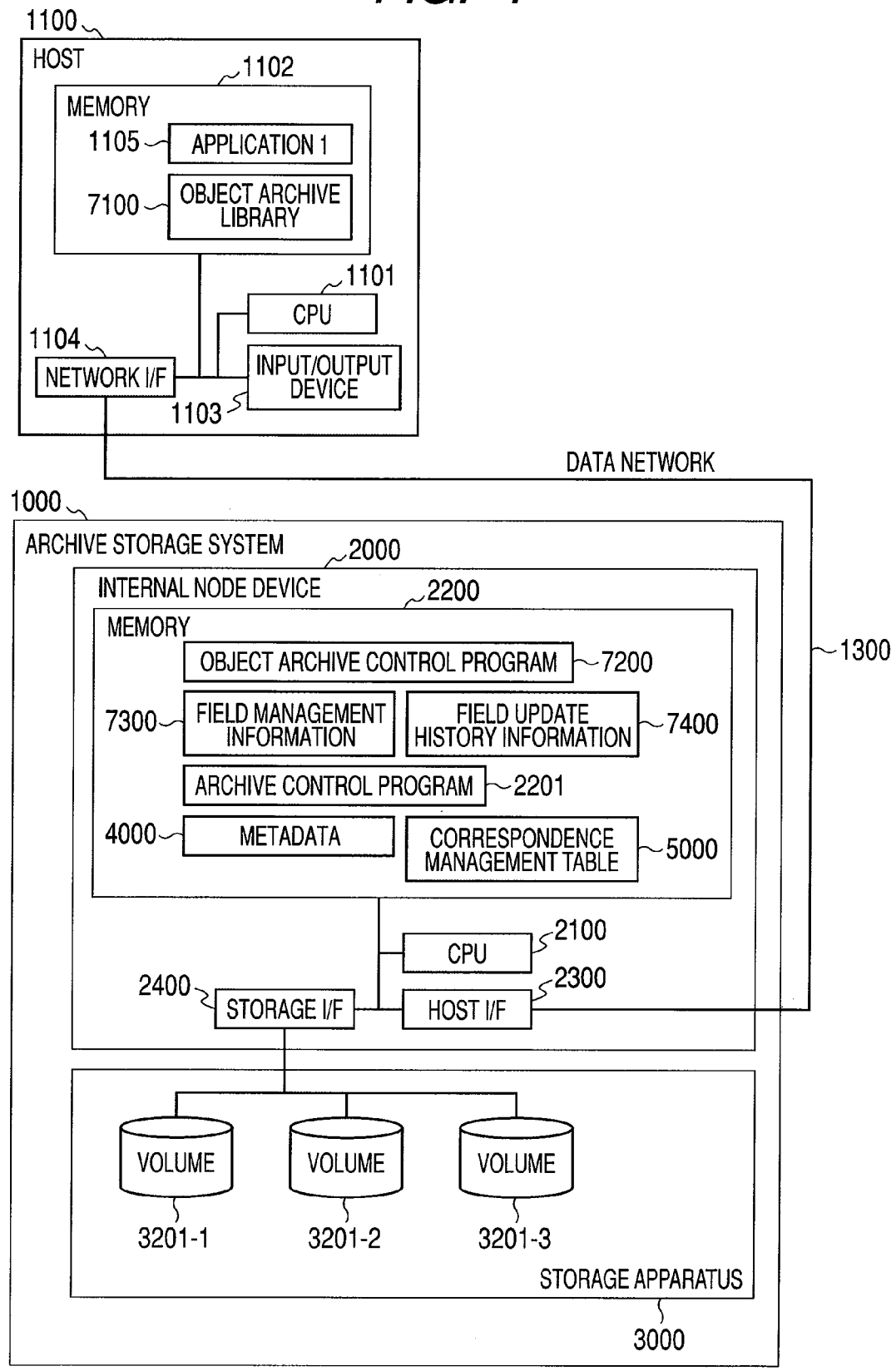
FIG. 1 is a block diagram showing a configuration of a computer system according to a first embodiment of the present invention.

FIG. 1 is a block diagram showing a configuration of a computer system according to the present invention.

A computer system according to the present embodiment includes a host 1100, an archive storage system 1000 which is accessed from the host 1100, and a data network 1300.

The data network 1300 is a data communication network capable of coupling the host 1100 and the archive storage system 1000 to each other. The data network 1300 according to the present embodiment is an IP network. It is to be noted that the data network 1300 may be other networks (e.g., Storage Area Network (SAN)) other than the IP network as long as they are data communication networks.

For the simplicity's sake, although the present embodiment describes and illustrates only one host 1100 and only one archive storage system 1000, there may be a number of host and a number of archive storage systems. Moreover, although the host 1100 sends a request with designation of an object ID to the archive storage system, it may send a request with designation of a path name to the archive storage system. Although not shown in the drawings, an additional host (hereinafter sometimes referred to as "path name designating host") which sends the request to designate the path name to the archive storage system may be coupled to the data network 1300. Moreover, in the later description, the term "host 1100" is meant to refer to a host which designates the object ID, while the term "host" is meant to include the path name designating host. Furthermore, the path name designating host may include a file application which makes accesses, typified by reading and writing, to files stored in the archive storage system 1000 through a file-based access.

However, the present invention is not limited to the first embodiment, and the term (e.g., send and receive) related to the exchange of information is used to mean not only the exchange of information or the like between physically separate entities in the normal sense of meaning (e.g., between computers, between a computer and a storage apparatus, between components, and the like), but also the exchange of information or the like between logically separate entities (e.g., between separate software elements being executed in a computer or a storage apparatus, in a case where a program body and a library has the same hierarchical structure, or in a case where a software has separate logical program execution entities such as processes or threads).

The host 1100 includes a Central Processing Unit (CPU) 1101, a memory 1102, an input/output device 1103, and a network I/F 1104, which are coupled one another.

The network I/F 1104 is a network interface that couples the host 1100 to the data network 1300. The network I/F 1104 sends and receive data to/from the archive storage system 1000 through the data network 1300.

The CPU 1100 is a processor that executes programs stored in the memory 1102. The processes executed by the programs stored in the memory 1102 in the following description are actually executed by the CPU 1100. In implementation of the present invention, a specialized hardware may be installed in addition to the CPU 1100 so that a part or the entire of processes of the programs is carried out the specialized hardware.

The memory 1102 stores therein an application 1105 and an object archive library 7100.

The application 1105 reads and writes objects containing a content data from/to the archive storage system 1000. For example, the application 1105 is a document management software or the like.

For the simplicity's sake, although FIG. 1 illustrates only one application 1105, there may be a plurality of applications 1105.

The object archive library 7100 is a library program of a program that provides an interface for allowing the application 1105 to send an archive request to an object archive control program 7200. A description of the archive request will be provided later in order to describe it together with the flow thereof.

The input/output device 1103 may be a keyboard, a mouse, and a display, for example.

The host 1100 may be a physically single computer or may be a virtual computer generated by logically dividing a physically single computer. In the latter case, resources such as the CPU 1101, the memory 1102, the input/output device 1103, and the network I/F 1104 are virtual resources generated by logically dividing a physical resource.

The archive storage system 1000 is a archive storage which includes an internal node device 2000 and a storage apparatus 3000. The internal node device 2000 (hereinafter sometimes referred to as "archive controller") includes a CPU 2100, a memory 2200, a host interface (I/F) 2300, and a storage I/F 2400, which are coupled one another.

The storage I/F 2400 is a network interface that couples the internal node device 2000 to the storage apparatus 3000. The storage I/F 2400 sends and receives data and control commands to/from the storage apparatus 3000.

The host I/F 2300 is a network interface that couples the internal node device 2000 to the data network 1300. The host I/F 2300 sends and receives data and control commands to/from the host 1100 through the data network 1300.

The CPU 2100 is a processor that executes programs stored in the memory 2200. The processes executed by the programs stored in the memory 2200 in the following description are actually executed by the CPU 2100. In implementation of the present invention, a specialized hardware may be installed in addition to the CPU 2100 so that a part or the entire of processes of the programs is carried out the specialized hardware.

The memory 2200 stores therein an object archive control program 7200, a field management information 7300, a field update history information 7400, an archive control program 2201, metadata 4000, and a correspondence management table 5000.

The object archive control program 7200 receives the archive request from the application 1102 that uses the object archive library 7100 to perform necessary processing such as management of objects, mapping to files, issuing of object IDs. Details of the processing will be described later.

The field management information 7300 is an area for managing fields when creating or editing objects, details of which will be described later with reference to FIG. 2.

Moreover, an identifier called an object ID is allocated to an object which is handled by the host 1100 in the present embodiment, and a plurality of information items called fields is included in the object. Each field is information for preserving and managing an attribute of a content data of an object or a content data which is managed as metadata. Moreover, each field contains not only a field name, the attribute of a content data or a content data managed as metadata, but also information as to whether the field is for read-only purposes and information as to whether or not an operation called binding is to be executed.

The binding is an operation which can be set for each field and in which when a field that permits the operation to be executed is updated, a new object including the updated field and other fields of an object other than the updated field is created so that both the content of the field after the update and the content of the field before the update are stored.

Each object may include the following fields as metadata in addition to a field for storing the object ID. The meanings of the respective fields will be described later in connection with the field management information 7300.

(1) "Retention Period" Field

This is a field for storing a retention period of the object or an expiration date of a retention period.

(2) "Owner" Field

This is a field for storing information on the owner of the object.

(3) "Hold" Field

This is a field for storing information that instructs as to whether or not the object is prevented from being deleted irrespective of the retention period.

The field update history information 7400 is an area for managing an update history of a field, and the structure and description thereof will be provided later with reference to FIG. 3.

The archive control program 2201 is a program that receives and processes a file or directory request from the host or the archive control program 2201.

The more detailed content of the processing by the archive control program 2201 is as follows.

For the respective processing, necessary information may be designated by the host or the archive control program 2201 by means of more than one commands and communications.

(1) File Read

A path name designated by the host or the archive control program 2201 and data of a file stored at a location within the file designated by the path name are read and sent to the host or the archive control program 2201 which made such designation. The designation of the path name or the location within the file includes not only directly designating it from the host or the archive control program, but also designating it through a plurality of commands in accordance with the protocol used in a network file system and other methods that enables to indirectly identify the path name and the location within the file.

(2) File Write

Newly written data or updated data received from the host or the archive control program 2201 is written to the designated path name and the location within the file designated by the path name. The designation of the path name or the location within the file includes not only directly designating it from the host or the archive control program, but also designating it through a plurality of commands in accordance with the protocol used in a network file system and other methods that enables to indirectly identify the path name and the location within the file.

(3) Acquisition of File Name and File Attribute

When a path name is designated, an attribute of the file designated by the path name received from the host or the archive control program is sent to the host or the archive control program. Here, the attribute includes file owner, read permission, write permission, execute permission, last access date, last update date, and file created date and may further include the withdrawal date of alteration prohibition. When the directory name is designated, the file name of the file stored in the designated directory and the attribute thereof are returned. Moreover, when a further directory is included in the designated directory, recursive processing may be performed.

(4) Change File Name or Directory Name (5) Set Withdrawal Date of Alteration Prohibition or Retention Period on File or Directory (6) Generate, Update or Delete Metadata for File (7) Keyword Search Based on Metadata Generated for File Searches are performed based on character strings, numbers, identifiers or the like contained in the metadata for files to return the path name of a corresponding file.

(8) Generate File (9) Delete File

The storage apparatus 3000 includes a plurality of volumes: Volume 3201-1, Volume 3201-2, and Volume 3201-3. These pluralities of volumes: Volume 3201-1, Volume 3201-2, and Volume 3201-3 will be collectively referred to as a volume 3201.

The volume 3201 may be either a Hard Disk Drive (HDD), which is a physical storage area, or a Logical Device, which is a logical storage area. In the present embodiment, the type of the volume is not particularly limited. For the simplicity's sake, although FIG. 1 illustrates three volumes 3201, the number of volumes 3201 is not particularly limited.

Moreover, a part or the entire of executions or implementations of a program may be implemented to include the internal node device 2000 in addition the CPU 2100. Furthermore, the hardware configuration of the internal node device described hitherto is merely for illustration purposes. A processor capable of sending and receiving requests and data to/from the host and processing the object archive control program 7200 and the archive control program 2201 according to the present invention and a hardware configuration capable of sending and receiving requests and data to/from the storage apparatus can also be considered as one form of the internal node device. More specifically, the hardware configuration of the internal node device 2000 may be configured by a plurality of devices or boards so that the processing of the program is executed separately by the plurality of devices or boards. In addition, the internal node device 2000 may perform other processing not related to the present invention.

FIG. 2 is an example of the field management information 7300.

The field management information 7300 is a table which is created for each object, and includes more than one field information items 1110D. For this reason, a plurality of field management information items 7300 may be present when a plurality of objects are manipulated, and respective information items are identified by their object IDs. Moreover, since the field management information 7300 is read and written by the object archive control program 7200, it may be located at other locations other than the internal node device 2000 as long as it can be read and written by the program.

The field information of the field management information 7300 corresponds to a field of a corresponding object, and includes "Field Name" column 1110A that identifies a field, "Attribute" column 1110B that manages the attribute of a field, and "Content" column 1110C that stores the content of a field.

The "Attribute" column 1110B includes "Type" column 1110B1 that identifies a type of the field, "Binding" column 1110B2 that manages whether or not "Binding" is to be performed for the field, "Read-only" column 1110B3 that represents whether or not the field is for "read-only" purposes, "Length" column 1110B4 that manages a data length of the field, and "Expansion File Name" column 1110B5 that describes a file name (or a path name) of an expansion destination file storing information of the "Content" column 1110C of the field when an object is stored in the volume of the storage apparatus. Moreover, the field management information 7300 may be a table in which the "Type" column 1110B1 or the "Expansion File Name" column 1110B5 is omitted, or may be a data structure in which other attributes are omitted. Furthermore, the field management information 7300 may be information having other formats other than the table format as long as the information can store the field name, Binding, read-only, content, and expansion file name of the field for each object. In later description, information that summarizes the plurality of field management information items 7300 is sometimes referred to as an object management information.

Moreover, each field information of the field management information 7300 stores information on a field of the same object as the field name in the field information, detailed description of which is provided below with reference to the example of FIG. 2.

The field information having a field name of "Object ID" stores an object ID of the object.

The field information having a field name of "Image1" stores the content data of an image corresponding to the field name "Image1" designated by the application 1105. Moreover, other names designated by the application 1105 may be used instead of the field name "Image1" of the field information. Furthermore, since a plurality of fields corresponding to the content data may be included in one object, there may be a plurality of fields storing the content data corresponding to an object ID.

The field information having a field name of "Retention Period" temporarily stores the retention period or the retention period expiration date of the object.

The field information having a field name of "Owner" stores information representing the owner of the object.

The field information having a field name of "Hold" stores information that instructs as to whether or not the object is prevented from being deleted irrespective of the retention period. In later description, it will be described that the object will be prevented from being deleted irrespective of the retention period when "ON" is stored as the content of the field information while a determination will be made as to the deletion of the object in the retention period when "OFF" is stored as the content.

FIG. 3 is an example of the field update history information 7400. The field update history information 7400 is a table which is created for each object, and includes more than one history information items. For this reason, a plurality of field update history information items 7400 may be present when a plurality of objects are manipulated, and respective information items are identified by their object IDs. Moreover, since the field update history information 7400 is read and written by the object archive control program 7200, it may be located at other locations other than the internal node device 2000 as long as it can be read and written by the program.

The history information of the field update history information 7400 includes "Update Information" column 1111D that manages whether a field has been created, modified, or deleted, "Field Name" column 1111A that identifies a field, "Attribute" column 1111B that manages the attribute of a field, and "Content" column 1111C that manages the content of a field.

The "Attribute" column 1111B includes "Type" column 1111B1 that identifies a type of the field, "Binding" column 1111B2 that manages whether or not "Binding" is to be performed for the field, "Read-only" column 1111B3 that represents whether or not the field is for "read-only" purposes, "Length" column 1111B4 that manages a data length of the field, and "Expansion File Name" column 1111B5 that describes a file name (or a path name) of an expansion destination file storing information of the "Content" column 1111C of the field when an object is stored in the volume of the storage apparatus. Moreover, the field update history information 7400 may be a table in which the "Type" column 1111B1 or the "Expansion File Name" column 1111B5 is omitted, or may be a data structure in which other attributes are omitted. Furthermore, the field update history information 7400 may have other forms other than the table form as long as the information can store the field name, Binding, read-only, content, and expansion file name of the field when the field is created, modified, or deleted for each object. In later description, information that summarizes the plurality of field update history information items 7400 is sometimes referred to as an object update history information.

FIG. 17 is an example of a field list file 1112. The field list file 1112 is used for management when an object is handled as a file.

The field list file 1112 is information that records a correspondence between a field of an object and a file storing the content of the field. The field list file 1112 is a table which is created for each object, and includes more than one field information items 1112D. Unlike the field management information 7300 or the field update history information 7400 which is temporarily created, the field list file 1112 is a file which essentially exists in correspondence to an object stored in the archive storage system.

The field information of the field list file 1112 corresponds to a field of a corresponding object, and includes "Field Name" column 1112A that identifies a field, "Attribute" column 1112B that manages the attribute of a field, and "Pointer" column 1112C which is a pointer to a file storing the content of a field.

The "Attribute" column 1112B includes "Type" column 1112B1 that identifies a type of the field, "Binding" column 1112B2 that manages whether or not "Binding" is to be performed for the field, "Read-only" column 1112B3 that represents whether or not the field is for "read-only" purposes, "Length" column 1112B4 that manages a data length of the field, and "Expansion File Name" column 1112B5 that describes a file name (or a path name) of an expansion destination file storing information of the "Content" column 1112C of the field when an object is stored in the volume of the storage apparatus. Moreover, the field list file 1112 may be a table in which the "Type" column 1112B1 or the "Expansion File Name" column 1112B5 is omitted, or may be a data structure in which other attributes are omitted.

The field list file 1112 is used to maintain the content of the field management information 7300 or to create the field management information 7300. Therefore, although the information on each column preserved in the field list file is the same as that of each column of the field management information 7300, they need not have the same data expression format, and moreover, when a part of the information is not necessary, they need not be the same on that unnecessary portion. The field list file 1112 may be a file having other structure other than the table structure as long as the file can store a pointer to a file storing the field name, Binding, read-only, content, and expansion file name of the field for each object. Here, although the pointer includes a file name and a path name, it may further include other identifier capable of identifying a file.

A description of the archive request made by the application 1105 will be provided.

In an object storage interface according to the present embodiment, a request is made to manipulate the object having the configuration shown in FIG. 2 in the following manner.

(Case where Application Creates Object)

A case where a request is made to archive (preserve) an object will be described. First, the application 1105 secures an area of the field management information 7300 by invoking "Object Create Request Process" (FIG. 4A) in the object archive library 7100. Next, "Field Create Request Process" (FIG. 5A) is invoked to make a request to store information as a field in the field management information 7300 for each attribute information which is managed as content data and metadata. Such operations repeatedly invoked by the number of attribute information items which are managed as content data and metadata. Next, "Commit Request Process" (FIG. 6A) is invoked to make a request to store the information of the area of the field management information 7300 in which the attribute information to be stored as the content data and the metadata is stored. Finally, "Object Create/Edit Termination Request Process" (FIG. 10A) is invoked to vacate the area of the field management information 7300.

(Case where Application Refers to or Updates Object)

A case where the content data of an object is updated will be described. First, the application 1105 invokes "Object Edit Request Process" (FIG. 7A) in the object archive library 7100 by designating an object ID to make a request to create the field management information 7300 containing the attribute information stored as the content data and the metadata for the object designated with the object ID. Next, "Field Edit Request Process" (FIG. 8A) is invoked to make a request to overwrite the field information containing the data to be preserved in the secured area of the field management information 7300. Alternatively, "Field Create Request Process" (FIG. 4A) is invoked to make a request to add the field information containing data to be preserved in the secured area of the field management information 7300. Further alternatively, "Field Delete Request Process" (FIG. 9A) is invoked to make a request to delete the field information of the secured area of the field management information 7300. Such operations are invoked by a number of times corresponding to the number of necessary fields. Next, "Commit Request Process" (FIG. 6A) is invoked to make a request to store the information of the area of the field management information 7300 in which the data is stored. Finally, "Object Create/Edit Termination Request Process" (FIG. 10A) is invoked to vacate the area of the field management information 7300 in which the data is temporarily stored.

As for the object ID, there may used a method of storing the object ID when an object is generated in the host 1100, or a method of extracting the object ID through keyword search for the field of the object by means of the object archive library 7100 and the object archive control program 7200.

Figure 7A:
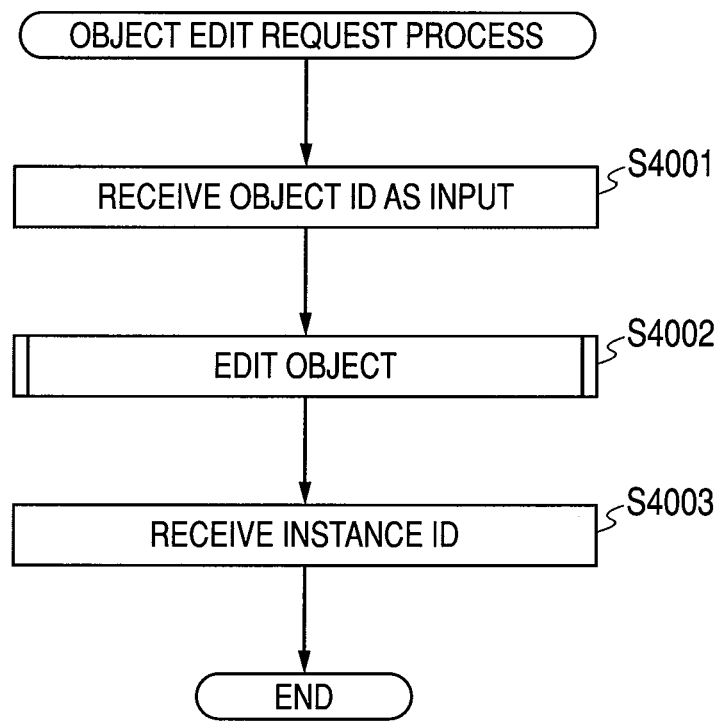
FIG. 7A is a flow chart for explaining an object edit request process according to the first embodiment of the present invention.

Moreover, when the content data or the metadata of the object is referred to, similar to the update flow, it is implemented by securing the field management information 7300. First, the application 1105 secures an area of the field management information 7300 by means of "Object Edit Request Process" (FIG. 7A). Thereafter, "Field Reference Request Process" (not shown) is invoked to acquire information of the designated field name. Such operations are repeated the necessary number of times. Finally, "Object Create/Edit Termination Request Process" (FIG. 10A) is invoked to vacate the area of the field management information 7300 in which the data is temporarily stored.

As for the field name included in the object, there may be used a method of storing the field name when an object is generated in the host 1100, or a method of providing the field name of each field of the object by means of the object archive library 7100 and the object archive control program 7200.

(Case where Application Deletes Object)

A case where an object is deleted will be described. The application 1105 deletes an object corresponding to a designated object ID by invoking "Object Delete Request Process" (FIG. 12A) in the object archive library 7100.

(Case Where Application Sets Retention Period to Object)

A case where a retention period is set to an object will be described. First, the application 1105 secures an area of the field management information 7300, in which data of the designated object ID is stored, by invoking "Object Edit Request Process" (FIG. 7A) in the object archive library 7100. Next, "Retention Period Setting Request Process" (FIG. 13A) is invoked to store the retention period as a field data. Next, "Commit Request Process" (FIG. 6A) is invoked to make a request to store the information of the area of the field management information 7300 in which the data is stored. Finally, "Object Create/Edit Termination Request Process" (FIG. 10A) is invoked to vacate the area of the field management information 7300 in which the data is temporarily stored.

Figure 4A:
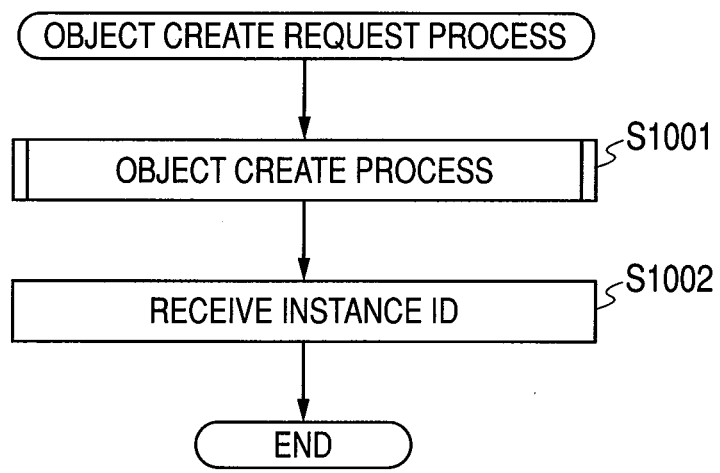
FIG. 4A is a flow chart for explaining an object create request process according to the first embodiment of the present invention.
Figure 4B:
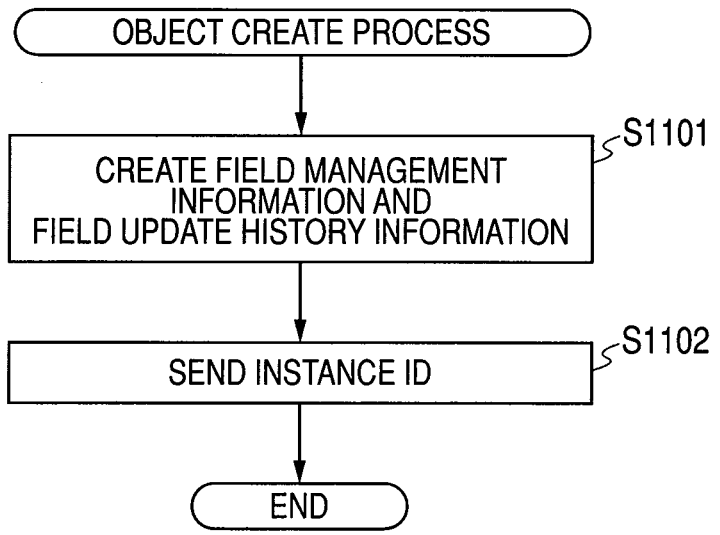
FIG. 4B is a flow chart for explaining an object create process according to the first embodiment of the present invention.

The flow of the object create process will be described with reference to the flow charts shown in FIGS. 4A and 4B.

First, the processing flow of the object archive library 7100 when the application 1105 invokes the "Object Create Request Process" in the object archive library 7100 linked to the archive application 1105 will be described with respect to FIG. 4A.

At step S1001, the object archive library 7100 sends the request for the object create process received from the application 1105 to the object archive control program 7200. Here, the object archive control program 7200 having received the request executes the object create process, and a description thereof will be provided later with respect to FIG. 4B.

Next, at step S1002, the object archive library 7100 receives an instance ID for editing from the object archive control program 7200 and sends the instance ID to the application 1105, and the process ends.

Next, the flow of the "Object Create Process" which the object archive control program 7200 performs upon receiving the request for the object create process from the object archive library 7100 will be described with respect to FIG. 4B.

The object archive control program 7200 having received the request for the object create process from the object archive library 7100 creates, at step S1101, the field management information 7300 and the field update history information 7400.

Next, at step S1102, the instance ID is sent to the source of the request, and the process ends. Moreover, as for the instance ID, an ID capable of uniquely identifying the created field management information, such as a process ID or a logical address of the object archive control program 7200 having received the request, is used.

Figure 5A:
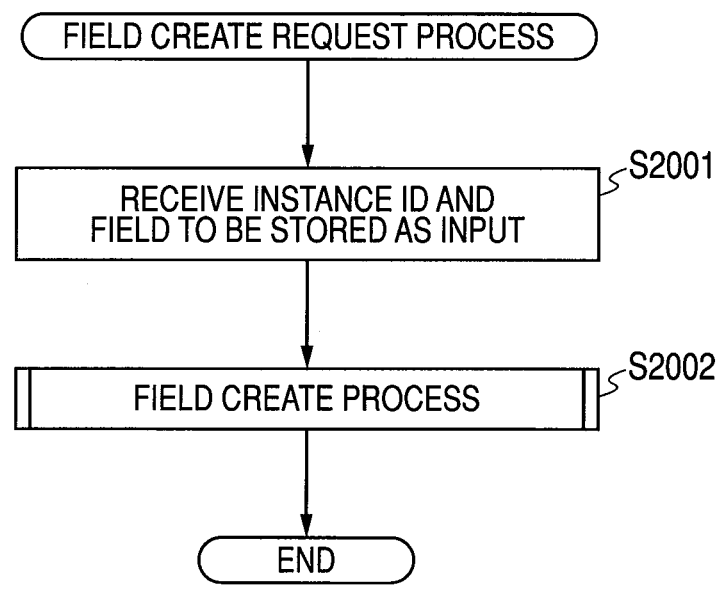
FIG. 5A is a flow chart for explaining a field create request process according to the first embodiment of the present invention.
Figure 5B:
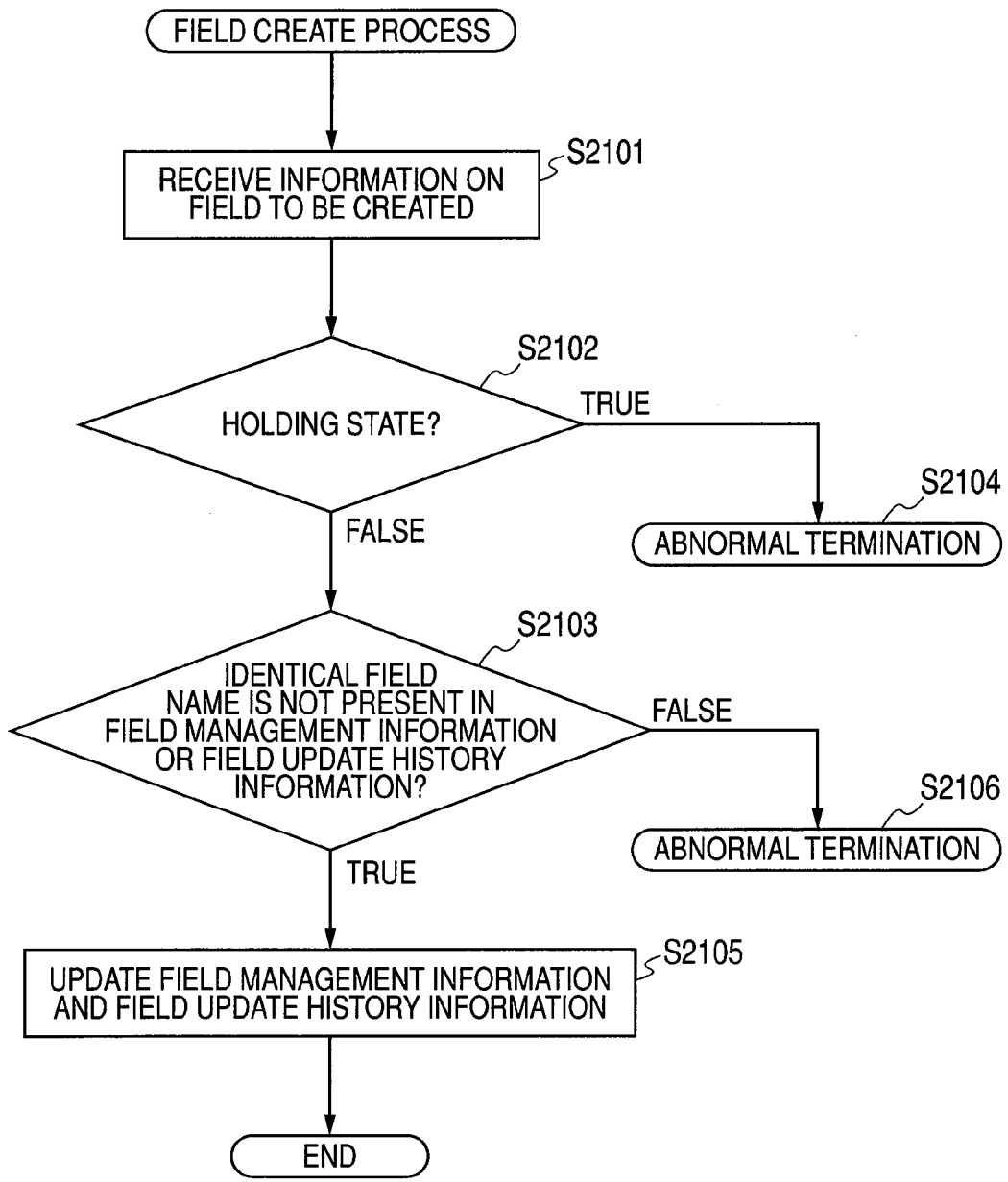
FIG. 5B is a flow chart for explaining a field create process according to the first embodiment of the present invention.

The flow of the field create process will be described with reference to the flow charts shown in FIGS. 5A and 5B.

First, the processing flow of the object archive library 7100 when the application 1105 invokes the "Field Create Request Process" in the object archive library 7100 linked to the archive application 1105 will be described with respect to FIG. 5A.

At step S2001, the object archive library 7100 receives, as an input value, the instance ID representing a target object and the content of a field to be created.

Next, at step S2002, the field create request is sent to the object archive control program 7200, together with the instance ID and the content of the field received at step S2001. Here, the object archive control program 7200 having received the request executes the field create process, and a description thereof will be provided later with respect to FIG. 5B.

In this way, the field create request process ends.

Next, the flow of "Field Create Process" which the object archive control program 7200 performs upon receiving the field create request from the object archive library 7100 will be described with respect to FIG. 5B.

The object archive control program 7200 having received the request for the field create process, the instance ID, and the content of the field from the object archive library 7100 reads, at step S2101, the field information to be created and identifies the field management information 7300 indicated by the received instance ID.

Next, at step S2102, the object archive control program 7200 refers to the content 1110C of a field corresponding to the field name 1110A "Hold" of the object to make a determination as to whether or not the object is in a holding state. If the object is not in the holding state (F), the process proceeds to step S2103. If the object is in the holding state (T), information representing a failed field create process is sent to the object archive library 7100 and the process ends (step S2104).

Next, at step S2103, the object archive control program 7200 makes a determination as to whether or not the field name received at step S2101 is not present in the field management information 7300 and the field update history information 7400. If the field name is not present in the field management information 7300 and the field update history information 7400 (T), the process proceeds to step S2105. If the field name is present in the field management information 7300 and the field update history information 7400 (F), information representing a failed field create process is sent to the object archive library 7100, and the process ends (step S2106).

Next, at step S2105, the object archive control program 7200 adds the field information received at step S2101 into the field management information 7300 and the field update history information 7400, and the process ends.

Moreover, the object archive library 7100 having received the information representing the failed field create process during the present processing flow sends a message representing the failed field create process to the application 1105.

Figure 6A:
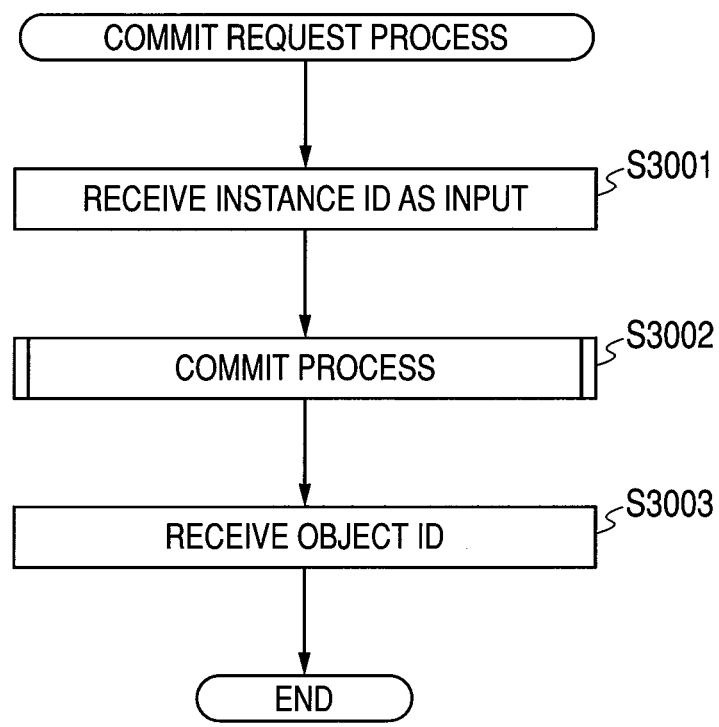
FIG. 6A is a flow chart for explaining a commit request process according to the first embodiment of the present invention.
Figure 6B:
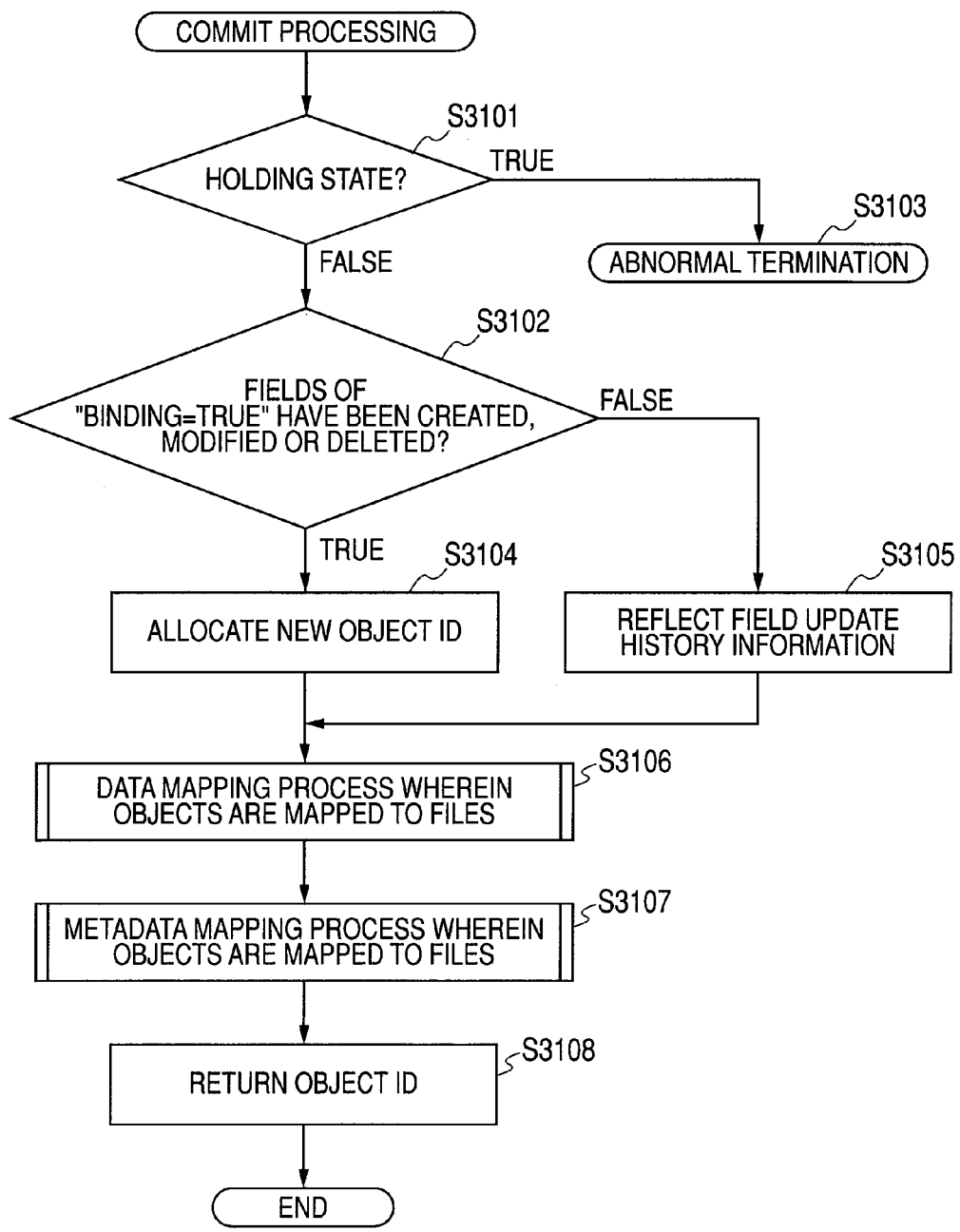
FIG. 6B is a flow chart for explaining a commit process according to the first embodiment of the present invention.

The flow of the commit process will be described with reference to the flow charts shown in FIGS. 6A and 6B.

First, the processing flow of the object archive library 7100 when the application 1105 invokes the "Commit Request Process" in the object archive library 7100 linked to the archive application 1105 will be described with respect to FIG. 6A.

At step S3001, the object archive library 7100 receives, as an input value, the instance ID representing the target object from the application 1105.

Next, at step S3002, the request for the commit process is sent to the object archive control program 7200, together with the instance ID received at step S3001. Here, the object archive control program 7200 having received the request executes the commit process, and a description thereof will be provided later with respect to FIG. 6B.

Next, at step S3003, the object archive library 7100 receives the object ID from the object archive control program 7200 and returns the object ID to the application 1105, and the process ends.

Next, the flow of "Commit Process" which the object archive control program 7200 performs upon receiving the request for the commit process from the object archive library 7100 will be described with respect to FIG. 6B.

At step S3101, the object archive control program 7200 makes a determination as to whether or not the object is in the holding state. The determination flow is the same as that described in connection with FIG. 5B. If the object is not in the holding state (F), the process proceeds to step S3102. If the object is in the holding state (T), information representing a failed field create process is sent to the object archive library 7100 and the process ends (step S3103).

Next, at step S3102, the object archive control program 7200 refers to the field update history information 7400 to make a determination as to whether or not a field of which the "Binding" 1111B2 is TRUE is updated. If at least one field of which the "Binding" 1111B2 is TRUE is updated (T), the process proceeds to step S3104. If a field of which the "Binding" 1111B2 is TRUE is not updated (F), the process proceeds to step S3105.

At step S3105, update information items of the respective fields described in the field update history information 7400 are reflected while the object to be updated maintains its original object ID. Specifically, when the entry of the update information 1111D is "Modify," a file indicated by the information of the Pointer 1112C of which the field information in the field list file 1112 has the same field name is updated, and if necessary, the "Attribute" column of the field list file 1112 is also updated. When the entry of the update information 1111D is "Delete," a file of a target field is located to be deleted, and the entries of the field in the field list file 1112 are also deleted. The above-described operations are performed while leaving the entries of the "Create" unchanged, and the process proceeds to step S3106. Moreover, when several field manipulations including Create, Modify, and Delete are to be performed on an identical field at this step, only the last manipulation may be performed to thereby speed up the processing.

Next, at step S3104, the object archive control program 7200 generates an object ID corresponding to the object. As for the generation of the object ID, a method of generating the object ID by generating a specialized counter for generating the object ID or using a date information is used; however, other methods may be used as long as the methods can generate non-overlapping object IDs. However, since the counter or the date is managed with a limited number of bits, the period in which "the object IDs do not overlap" does not means an eternity but means the number of generation times or a period designated by a user or defined by a standard or the like.

Next, at step S3106, the object archive control program 7200 performs a data mapping process wherein objects are mapped to files. A description of the data mapping process from objects to files will be provided later.

Next, at step S3107, the object archive control program 7200 performs a metadata mapping process wherein objects are mapped to files. A description of the metadata mapping process from objects to files will be provided later.

Next, at step S3108, the object archive control program 7200 sends the object ID to the object archive library 7100, and the process ends.

Figure 7B:
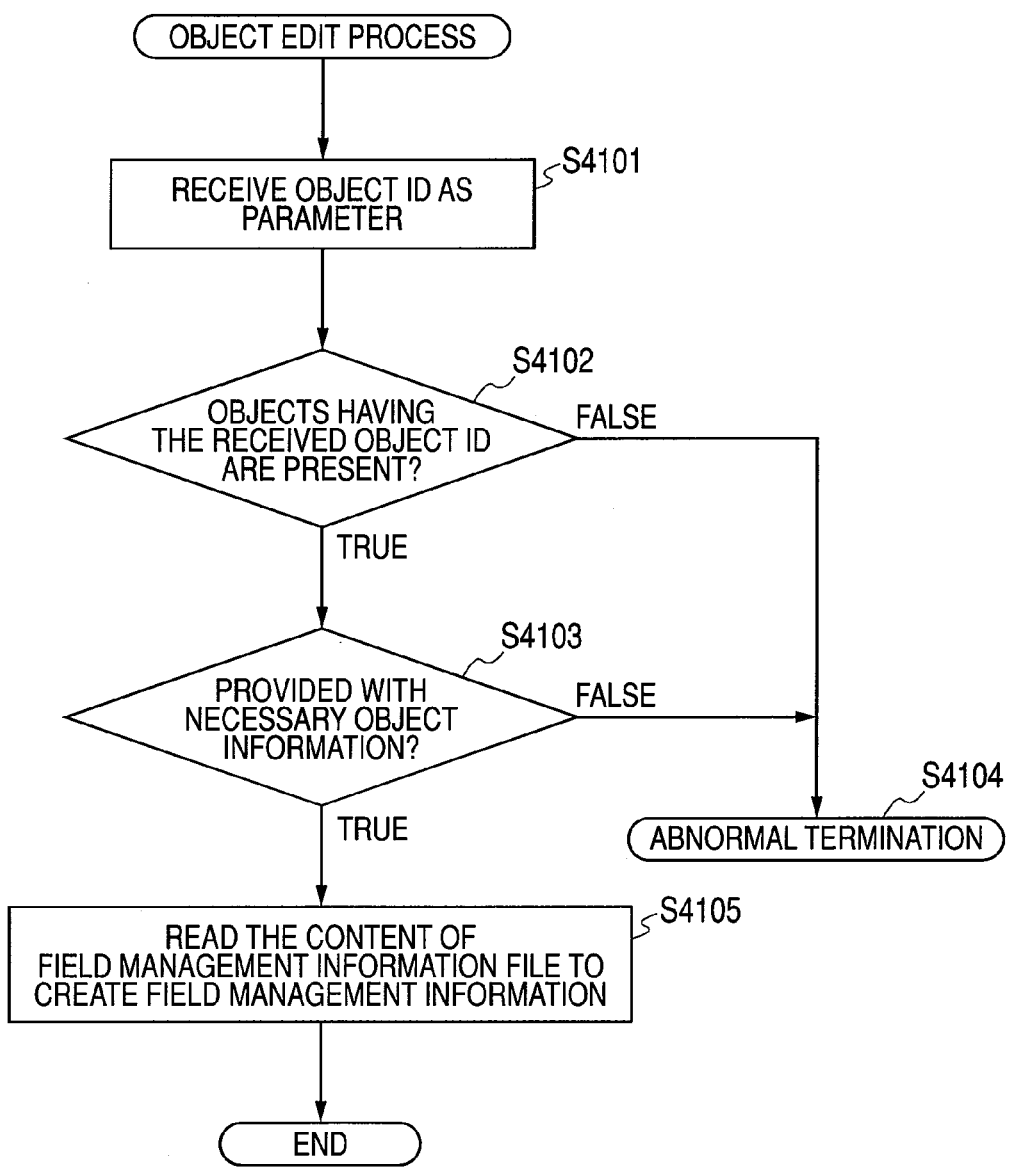
FIG. 7B is a flow chart for explaining an object edit process according to the first embodiment of the present invention.

The flow of the object edit process will be described with reference to the flow charts shown in FIGS. 7A and 7B.

First, the processing flow of the object archive library 7100 when the application 1105 invokes the "Object Edit Request Process" in the object archive library 7100 linked to the archive application 1105 will be described with respect to FIG. 7A.

At step S4001, the object archive library 7100 receives, as an input value, the object ID representing the target object.

Next, at step S4002, the request for the object edit process is sent to the object archive control program 7200, together with the object ID received at step S4001. Here, the object archive control program 7200 having received the request executes the object edit process, and a description thereof will be provided later with respect to FIG. 7B.

Next, at step S4003, the object archive library 7100 receives the instance ID from the object archive control program 7200, and the process ends.

Next, the flow of the "Object Edit Process" which the object archive control program 7200 performs upon receiving the request for the object edit process from the object archive library 7100 will be described with respect to FIG. 7B.

First, at step S4101, the object archive control program 7200 receives an object ID from the object archive library 7100.

Next, at step S4102, a determination is made as to whether or not an object having the object ID is present. If the object having the object ID is present (T), the process proceeds to step S4103. If the object having the object ID is not present (F), information representing a failed object edit process is sent to the object archive library 7100, and the process ends (step S4104). According to an example process of making a determination as to the presence of the object, a request with designation of a directory name may be sent to the archive control program 2201 in order to make a determination as to the presence of the directory having the directory name of the received object ID, or a request to make a determination as to whether or not the field list file is present in a directory designated by the object ID may be sent to the archive control program 2201.

Next, at step S4103, a determination is made as to whether or not information corresponding to the object ID is provided with. Specifically, by referring to the content of the field list file 1112 for the object ID, it is determined whether or not all the expansion files corresponding to the described fields are present. If the information corresponding to the object of the object ID is provided with (T), the process proceeds to step S4105. If the information corresponding to the object of the object ID is not provided with (F), information representing a failed object edit process is sent to the object archive library 7100, and the process ends (step S4104).

Next, at step S4105, the object archive control program 7200 creates, on the memory 2200, the field management information 7300 of the object indicated by the object ID based on the content of the field list file 1112. Specifically, the Field Name 1110A and the Attribute 11108 described in the field list file 1112 are read, and the content of a file indicated by the Pointer 1112C of the field list file 1112 is read, thereby creating the field management information 7300 for the object. Then, the process ends.

Moreover, the object archive library 7100 having received the information representing the failed object edit process during the present processing flow sends a message representing the failed object edit process to the application 1105.

Moreover, in the present processing flow, in addition to returning the fail message when the field list file is not found, the fail message may be returned when a file corresponding to the field listed in the field list file is not present. By doing this, it is possible to detect altered or deleted information by manipulating the file format. However, when a file corresponding to the field listed in the field list file is not present, the process may resume by concluding that there is not field corresponding the non-present file, and an alert message may be sent simultaneously with the resume. By doing this, even when some fields are missing, the processing of the application 1105 can be continued without stopping the referencing of the objects. Besides, a certain message may be sent when a file necessary for editing the objects is missing.

Figure 8A:
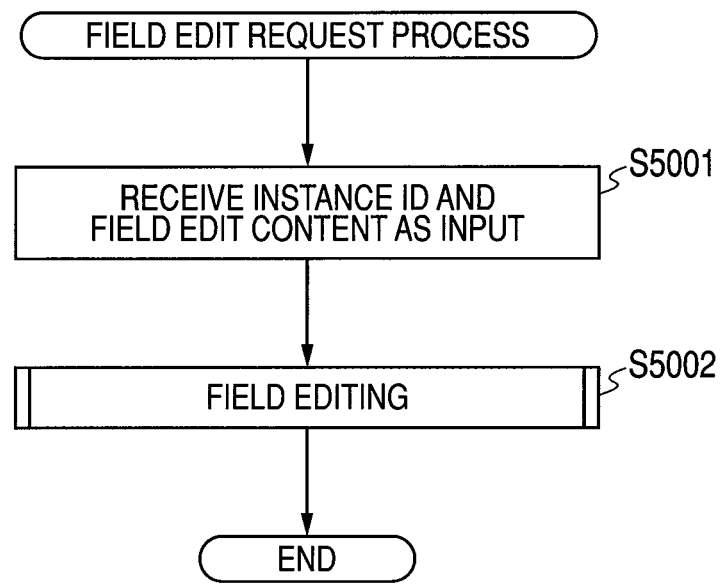
FIG. 8A is a flow chart for explaining a field edit request process according to the first embodiment of the present invention.
Figure 8B:
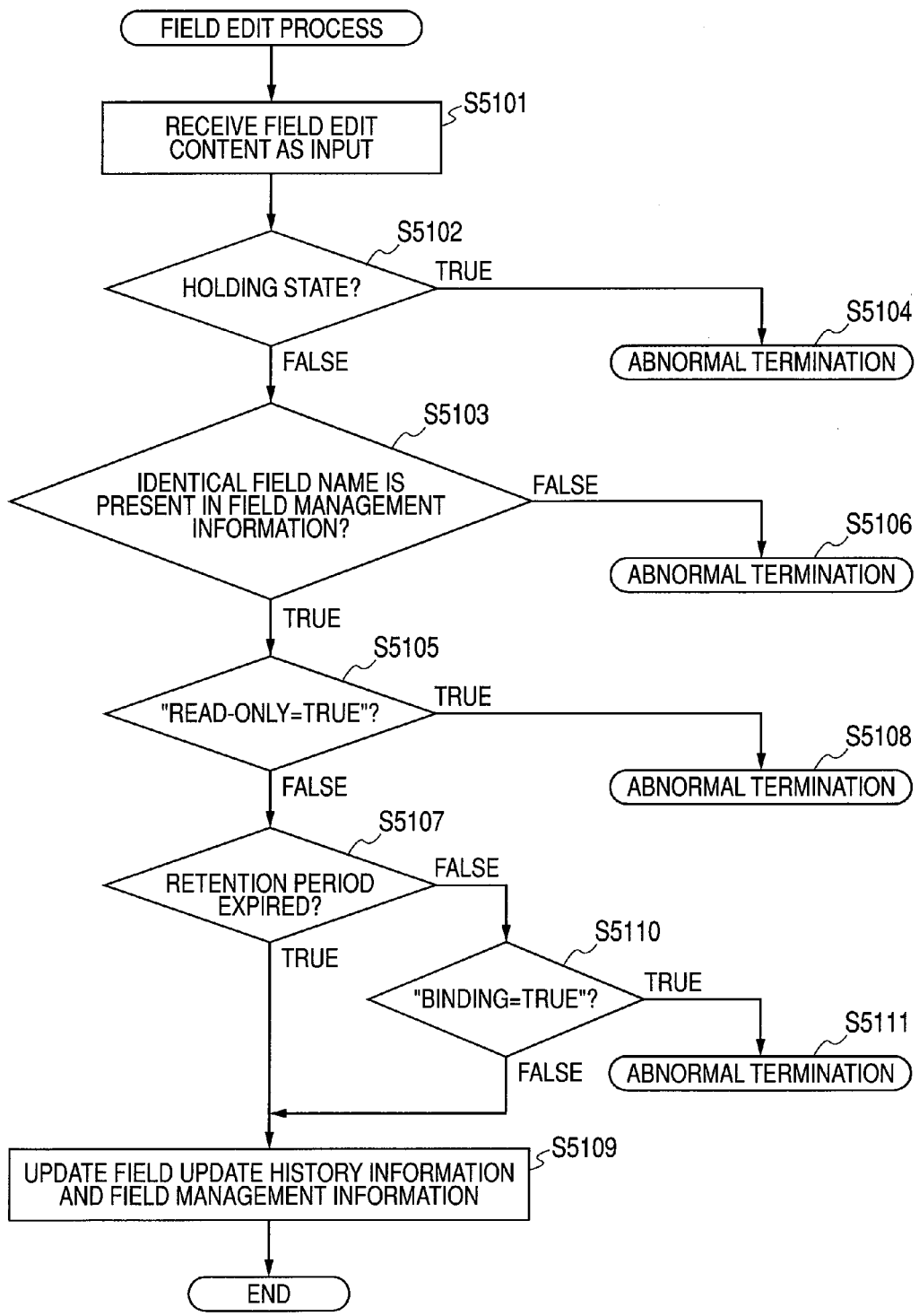
FIG. 8B is a flow chart for explaining a field edit process according to the first embodiment of the present invention.

The flow of the field edit process will be described with reference to the flow charts shown in FIGS. 8A and 8B.

First, the processing flow of the object archive library 7100 when the application 1105 invokes the "Field Edit Request Process" in the object archive library 7100 linked to the archive application 1105 will be described with respect to FIG. 8A.

At step S5001, the object archive library 7100 receives, as an input value, the instance ID representing the target object and information (Field Name and information of Binding, Read-Only or Content) of a field to be edited.

Next, at step S5002, the field edit request is sent to the object archive control program 7200, together with the instance ID and the information (Field Name and information of Binding, Read-Only or Content) of the field to be edited received at step S5001. Here, the object archive control program 7200 having received the request executes the field edit process, and a description thereof will be provided later with respect to FIG. 8B.

In this way, the field edit request process ends.

Next, the flow of "Field Edit Process" which the object archive control program 7200 performs upon receiving the field edit request from the object archive library 7100 will be described with respect to FIG. 8B.

At step S5101, the object archive library 7100 receives, as an input value, the instance ID representing the received target object and the information (Field Name and information of Binding, Read-Only or Content) of the field to be edited.

Next, at step S5102, the object archive control program 7200 makes a determination as to whether or not the object is in the holding state. The determination flow is the same as that described in connection with FIG. 5B. If the object is not in the holding state (F), the process proceeds to step S5103. If the object is in the holding state (T), information representing a failed field edit process is sent to the object archive library 7100 and the process ends (step S5104).

Next, at step S5103, the object archive control program 7200 makes a determination as to whether or not the field name received at step S5101 is present in the field management information 7300. If the field name is present in the field management information 7300 (T), the process proceeds to step S5105. If the field name is not present in the field management information 7300 (F), information representing a failed field edit process is sent to the object archive library 7100, and the process ends (step S5106).

Next, at step S5105, the object archive control program 7200 refers to the field management information 7300 to make a determination as to whether or not the "Read-Only" 1110B3 of the field is TRUE. If the "Read-Only" 1110B3 of the field is FALSE (F), the process proceeds to step S5107. If the "Read-Only" 1110B3 of the field is TRUE (T), information representing a failed field edit process is sent to the object archive library 7100, and the process ends (step S5108).

Next, at step S5107, the object archive control program 7200 refers to the field management information 7300 to refer to a value of the retention period described in the Content 1110C of the entries of which the Field Name 1110A of the object is "Retention Period" to thereby make a determination as to whether or not the retention period of the object has expired. If the retention period of the object has expired (T), the process proceeds to step S5109. If the retention period of the object has not expired (F), the process proceeds to step S5110.

Next, at step S5110, the object archive control program 7200 refers to the field management information 7300 to make a determination as to whether or not the "Binding" 1110B2 of the field is TRUE. If the "Binding" 1110B2 is FALSE (F), the process proceeds to step S5109. If the "Binding" 1110B2 is TRUE (T), information representing a failed field edit process is sent to the object archive library 7100, and the process ends (step S5111).

Next, at step S5109, the object archive control program 7200 adds the field editing content to the field update history information 7400 to update the content of the field of the field management information 7300, and the process ends.

Moreover, the object archive library 7100 having received the information representing the failed field edit process during the present processing flow sends a message representing the failed field edit process to the application 1105.

Figure 9A:
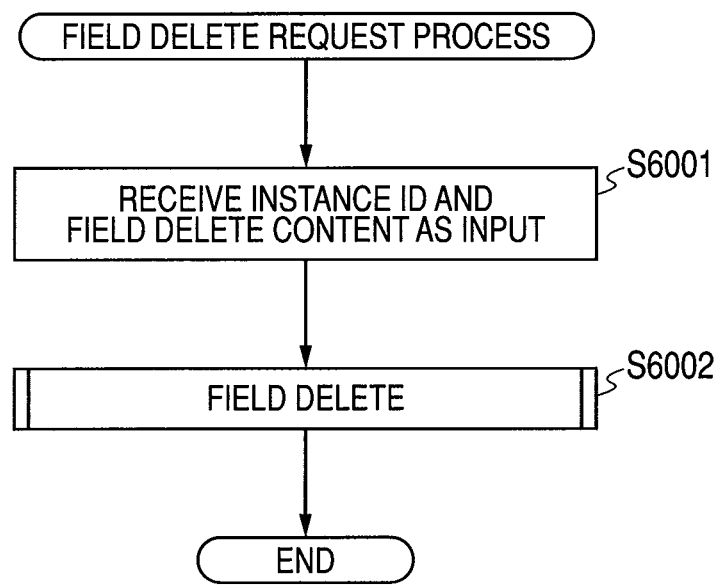
FIG. 9A is a flow chart for explaining a field delete request process according to the first embodiment of the present invention.
Figure 9B:
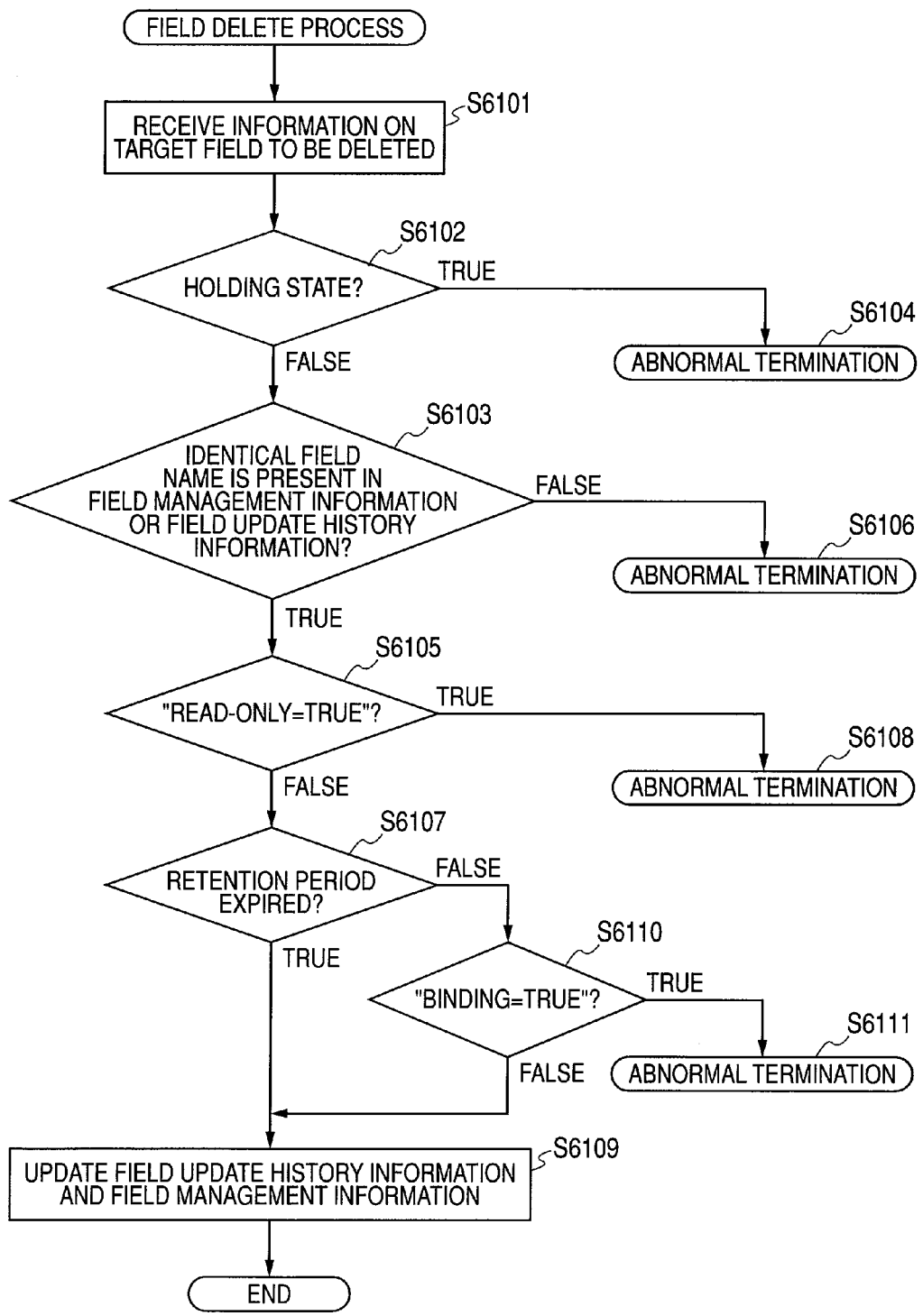
FIG. 9B is a flow chart for explaining a field delete process according to the first embodiment of the present invention.

The flow of the field delete process will be described with reference to the flow charts shown in FIGS. 9A and 9B.

First, the processing flow of the object archive library 7100 when the application 1105 invokes the "Field Delete Request Process" in the object archive library 7100 linked to the archive application 1105 will be described with respect to FIG. 9A.

At step S6001, the object archive library 7100 receives, as an input value, the instance ID representing the target object and the field name of a field to be deleted.

Next, at step S6002, the field delete request is sent to the object archive control program 7200, together with the instance ID and the field name of the field to be deleted, received at step S6001. Here, the object archive control program 7200 having received the request executes the field delete process, and a description thereof will be provided later with respect to FIG. 9B.

In this way, the field delete request process ends.

Next, the flow of "Field Delete Process" which the object archive control program 7200 performs upon receiving the field delete request from the object archive library 7100 will be described with respect to FIG. 9B.

At step S6101, the object archive library 7100 receives, as an input value, the instance ID representing the target object and the field name of a field to be deleted.

Next, at step S6102, the object archive control program 7200 makes a determination as to whether or not the object is in the holding state. The determination flow is the same as that described in connection with FIG. 5B. If the object is not in the holding state (F), the process proceeds to step S6103. If the object is in the holding state (T), information representing a failed field delete process is sent to the object archive library 7100 and the process ends (step S6104).

Next, at step S6103, the object archive control program 7200 makes a determination as to whether or not the field name received at step S6101 is present in the field management information 7300. If the field name is present in the field management information 7300 (T), the process proceeds to step S6105. If the field name is not present in the field management information 7300 (F), information representing a failed field delete process is sent to the object archive library 7100, and the process ends (step S6106).

Next, at step S6105, the object archive control program 7200 refers to the field management information 7300 to make a determination as to whether or not the "Read-Only" 1110B3 of the field is TRUE. If the "Read-Only" 1110B3 of the field is FALSE (F), the process proceeds to step S6107. If the "Read-Only" 1110B3 of the field is TRUE (T), information representing a failed field delete process is sent to the object archive library 7100, and the process ends (step S6108).

Next, at step S6107, the object archive control program 7200 refers to the field management information 7300 to make a determination as to whether or not the retention period of the object has expired. The determination flow is the same as that described in connection with FIG. 8B. If the retention period of the object has expired (T), the process proceeds to step S6109. If the retention period of the object has not expired (F), the process proceeds to step S6110.

Next, at step S6110, the object archive control program 7200 refers to the field management information 7300 to make a determination as to whether or not the "Binding" 1110B2 of the field is TRUE. If the "Binding" 1110B2 is FALSE (F), the process proceeds to step S6109. If the "Binding" 1110B2 is TRUE (T), information representing a failed field delete process is sent to the object archive library 7100, and the process ends (step S6111).

Next, at step S6109, the object archive control program 7200 adds the field deletion content to the field update history information 7400 to delete the entries of the field of the field management information 7300, and the process ends.

Moreover, the object archive library 7100 having received the information or message representing the failed field delete process during the present processing flow sends a message representing the failed field delete process to the application 1105.

Figure 10A:
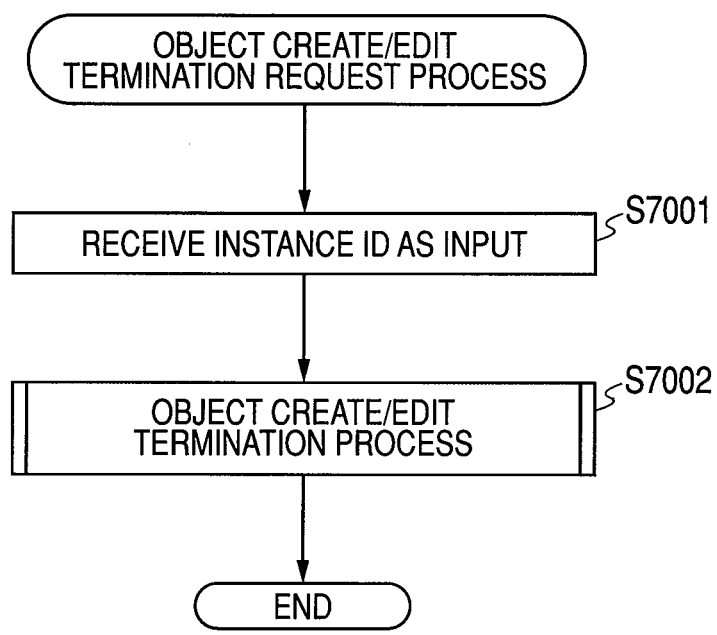
FIG. 10A is a flow chart for explaining an object create/edit termination request process according to the first embodiment of the present invention.
Figure 10B:
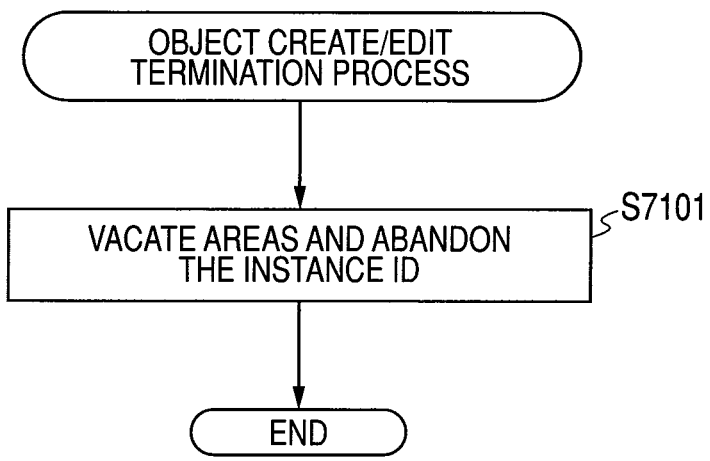
FIG. 10B is a flow chart for explaining an object create/edit termination process according to the first embodiment of the present invention.

The flow of the object create/edit termination process will be described with reference to the flow charts shown in FIGS. 10A and 10B.

First, the processing flow of the object archive library 7100 when the application 1105 invokes the "Object Create/Edit Termination Request Process" in the object archive library 7100 linked to the archive application 1105 will be described with respect to FIG. 10A.

At step S7001, the object archive library 7100 receives, as an input value, the instance ID representing a target object for which the creating and editing are to be terminated.

Next, at step S7002, the object create/edit termination request is sent to the object archive control program 7200, together with the instance ID received at step S7001. Here, the object archive control program 7200 having received the request executes the object create/edit termination process, and a description thereof will be provided later with respect to FIG. 10B.

In this way, the object create/edit termination request process ends.

Next, the flow of the "Object Create/Edit Termination Process" which the object archive control program 7200 performs upon receiving the object create/edit termination request from the object archive library 7100 will be described with respect to FIG. 10B.

At step S7101, the object archive control program 7200 vacate the areas of the field management information 7300 and the field update history information 7400 secured for the instance ID serving as a target and abandons the instance ID (e.g., by setting an empty value (NULL) to the instance ID), and the process ends.

Figure 11A:
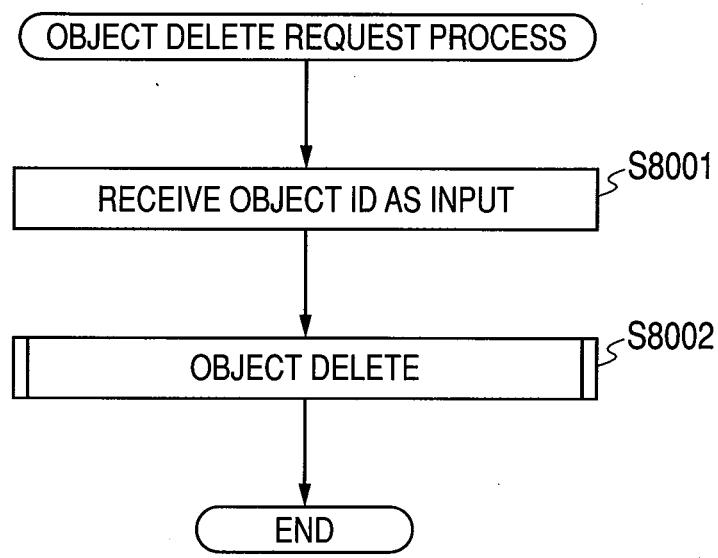
FIG. 11A is a flow chart for explaining an object delete request process according to the first embodiment of the present invention.
Figure 11B:
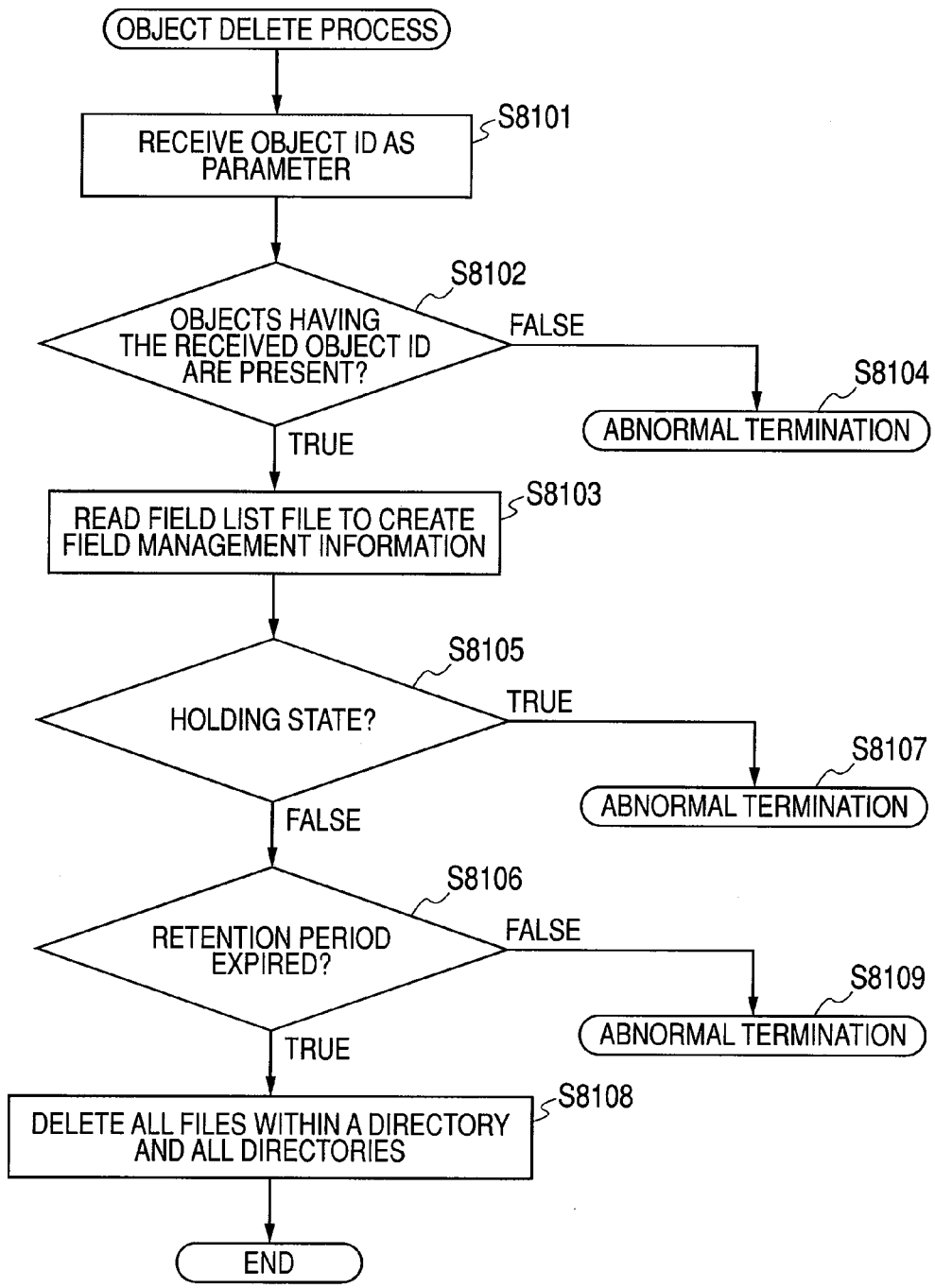
FIG. 11B is a flow chart for explaining an object delete process according to the first embodiment of the present invention.

The flow of the object delete process will be described with reference to the flow charts shown in FIGS. 11A and 11B.

First, the processing flow of the object archive library 7100 when the application 1105 invokes the "Object Delete Request Process" in the object archive library 7100 linked to the archive application 1105 will be described with respect to FIG. 11A.

At step S8001, the object archive library 7100 receives, as an input value, the object ID to be deleted.

Next, at step S8002, the object delete request is sent to the object archive control program 7200, together with the input value. Here, the object archive control program 7200 having received the request executes the object delete process, a description thereof will be provided later with respect to FIG. 11B.

In this way, the object delete request process ends.

Next, the flow of "Object Delete Process" performed by the object archive control program 7200 will be described with respect to FIG. 11B.

First, at step S8101, the object archive control program 7200 receives the object ID of an object to be deleted.

Next, at step S8102, the object archive control program 7200 makes a determination as to whether or not an object having the object ID received from the object archive library 7100 is present. If the object having the object ID is present (T), the process proceeds to step S8103. If the object having the object ID is not present (F), information representing a failed object delete process is sent to the object archive library 7100, and the process ends (step S8104).

Next, at step S8103, the object archive control program 7200 creates, on the memory 2200, the field management information 7300 for the object indicated by the object ID. The creating flow is the same as that described in connection with FIG. 7B.

Next, at step S8105, the object archive control program 7200 makes a determination as to whether or not the object is in the holding state. The determination flow is the same as that described in connection with FIG. 5B. If the object is not in the holding state (F), the process proceeds to step S8106. If the object is in the holding state (T), information representing a failed object delete process is sent to the object archive library 7100 and the process ends (step S8107).

Next, at step S8106, the object archive control program 7200 refers to the field management information 7300 to make a determination as to whether or not the retention period of the object has expired. The determination flow is the same as that described in connection with FIG. 8B. If the retention period of the object has expired (T), the process proceeds to step S8108. If the retention period of the object has not expired (F), information representing a failed object delete process is sent to the object archive library 7100, and the process ends (S8109).

Next, at step S8108, the files of the respective fields described in the field list file 1112 of the object to be deleted are deleted, while deleting the field list file itself and the directory for the target object to be deleted, and the process ends.

Moreover, the object archive library 7100 having received the information or message representing the failed object delete process during the present processing flow sends a message representing the failed object delete process to the application 1105.

The field create or edit process according to the present embodiment is to set and update the content of the fields as illustrated above. The archive request according to the present embodiment may include a request to perform an operation on the archive storage system 1000, in addition to the request to set and change the content of the fields. A case of setting the retention period of the object, which is an example of the operation, will be described below.

Figure 12A:
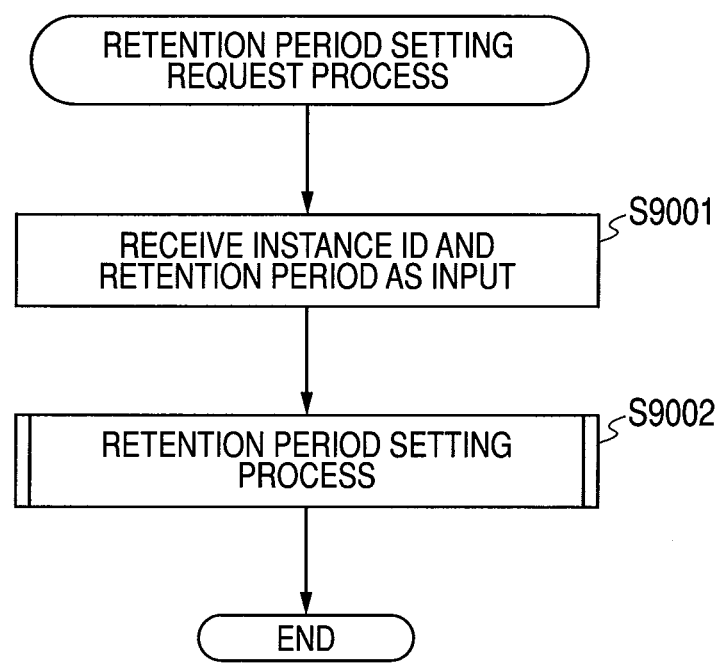
FIG. 12A is a flow chart for explaining a retention period setting request process according to the first embodiment of the present invention.
Figure 12B:
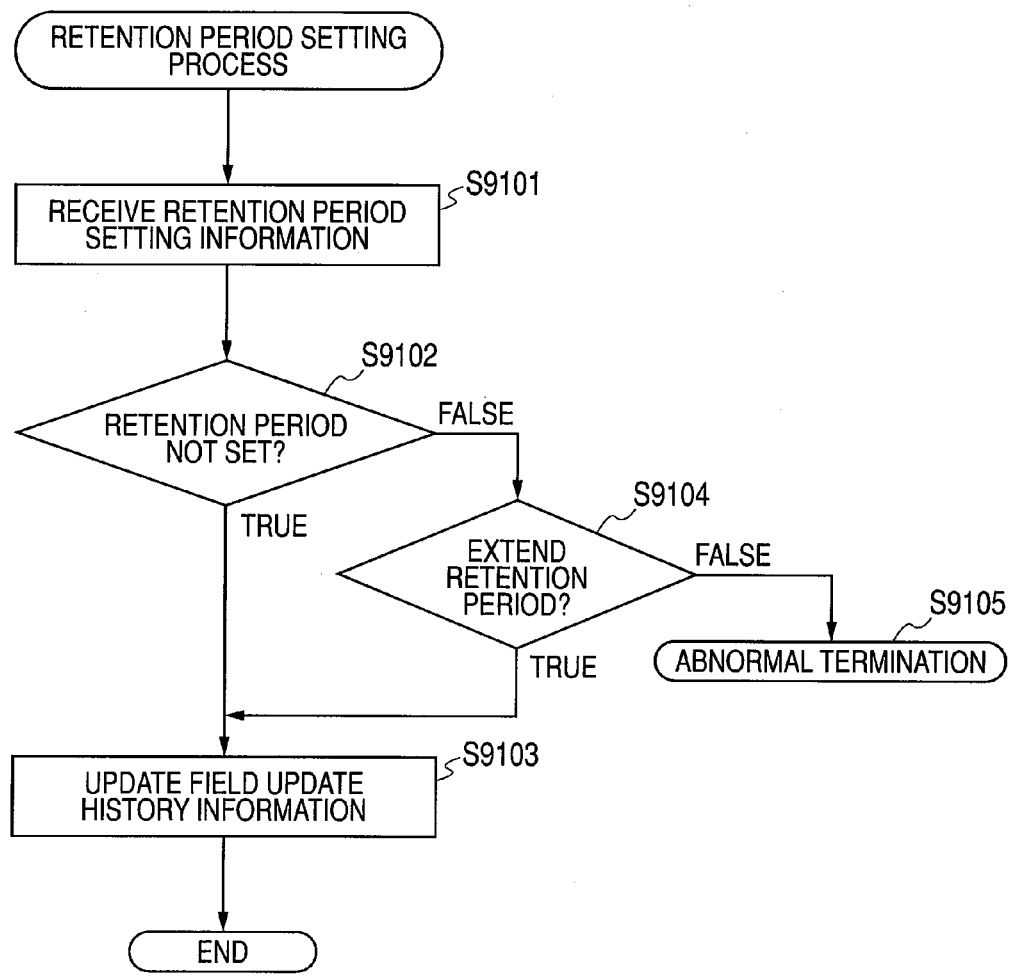
FIG. 12B is a flow chart for explaining a retention period setting process according to the first embodiment of the present invention.

The flow of the retention period setting process will be described with reference to the flow charts shown in FIGS. 12A and 12B.

First, the processing flow of the object archive library 7100 when the application 1105 invokes the "Retention Period Setting Request Process" in the object archive library 7100 linked to the archive application 1105 will be described with respect to FIG. 12A.

At step S9001, the object archive library 7100 receives, as an input value, the instance ID representing the target object and the field name of a field "Retention Period."

Next, at step S9002, the retention period setting request is sent to the object archive control program 7200, together with the instance ID received at step S9001. Here, the object archive control program 7200 having received the request executes the retention period setting process, and a description thereof will be provided later with respect to FIG. 12B.

In this way, the retention period setting request process ends.

Next, the flow of the "Retention Period Setting Process" which the object archive control program 7200 performs upon receiving the retention period setting request from the object archive library 7100 will be described with respect to FIG. 12B.

At step S9101, the object archive library 7100 receives, as an input value, the instance ID representing the received target object.

Next, at step S9102, the object archive control program 7200 makes a determination as to whether or not the retention period is set to the object. Specifically, a determination is made as to whether an entry of which the Field Name 1110A is "Retention Period" is present in the field management information 7300 for the object and whether a value is set to the Content 1110C. If the retention period is not set to the object (T), the process proceeds to step S9103. If the retention period is set to the object (F), the process proceeds to step S9104. As for the setting value of the retention period, a method of setting the date of expiration of the retention period and providing information on the set date may be considered, and besides, a period of time from the present time to a future time may be set so that when it is referenced, information on the set period is provided together with the date of setting of the retention period, and alternatively, information on a remaining period may be provided when being referenced.

Next, at step S9104, the object archive control program 7200 makes a determination as to whether or not the retention period expiration date when the retention period received at step S9101 is used is extended from a preset expiration data of the retention period (retention period extension setting). If the retention period received at step S9101 is extended from the preset expiration date of the retention period, the process proceeds to step S9103. If the retention period received at step S9101 is reduced from the preset expiration date of the retention period (retention period reduction setting), information representing a failed retention period setting process is sent to the object archive library 7100, and the process ends (step S9105).

Next, at step S9103, the object archive control program 7200 update the fields for setting the retention period in the field management information 7300 and the process ends.

Moreover, the object archive library 7100 having received the information representing the failed retention period setting process during the present processing flow sends a message representing the failed retention period setting process to the application 1105.

The flow of the data mapping process wherein objects are mapped to files, which is invoked at step S3106 of the commit process in FIG. 6B will be described with reference to the flow chart shown in FIG. 13.

First, at step S10001, the object archive control program 7200 makes a determination as to whether or not the target object is an existing one. If it is an existing object (T), the process proceeds to step S10002. If it is a new object (F), the process proceeds to step S10003.

At step S10002, fields of which the update information 1111D in the field update history information 7400 is "Create" are identified as fields to be processed during the present processing flow, and the process proceeds to step S10006.

At step 10003, entire fields of the field management information 7300 for the target object are identified as fields to be processed during the present processing flow.

Next, at step S10004, the object archive control program 7200 sends a request to create an object directory to the archive control program 2201. The archive control program 2201 generates a directory name using a predetermined rule based on the object ID and sends a request to create a directory for an object having the directory name to the archive control program. Then, the archive control program having received the request creates the object directory.

Next, at step S10005, the object archive control program 7200 sends an instruction to the archive control program 2201 to create a field list file for an object in the created directory. The archive control program 2201 creates the field list file in accordance with the instruction, and the process proceeds to step S10006.

At step S10006, a determination is made as to whether or not there are any more fields to be processed among the fields identified at step S10002 or step S10003. If there are any more fields to be processed (T), the process proceeds to step S10007. If there are no more fields to be processed, the process ends.

At step S10007, the object archive control program 7200 generates a file name of a file of which the content of the field is to be preserved using a predetermined rule based on the field name with respect to the fields to be processed. Moreover, a request is sent to the archive control program 2201 to generate a file having the generated file name in the object directory and to write the content of the field in the file. Then, the archive control program 2201 writes the content of the field in the file to be stored in the directory in accordance with the request.

Next, at step S10008, the object archive control program 7200 sends a request to the archive control program 2201 to overwrite the information of at least the Field Name column, the Binding Column, and the Read-Only column among the field management information items 7300 for the fields to be processed and the file name (or the path name of the file), as the information of the Pointer 1112C, generated at step S10006 into the field list file. The archive control program 2201 overwrites the information of the Field Name column, the Binding column, and the Read-Only column for the field and the file name (or the path name of the file), as the information of the Pointer 1112C, generated at step S10006 into the field list file in accordance with the received request, and remove the field from the fields identified at step S10002 or S10003, and the process returns to step S10006.

The description of the processing flow has been provided hereinabove.

Figure 14:
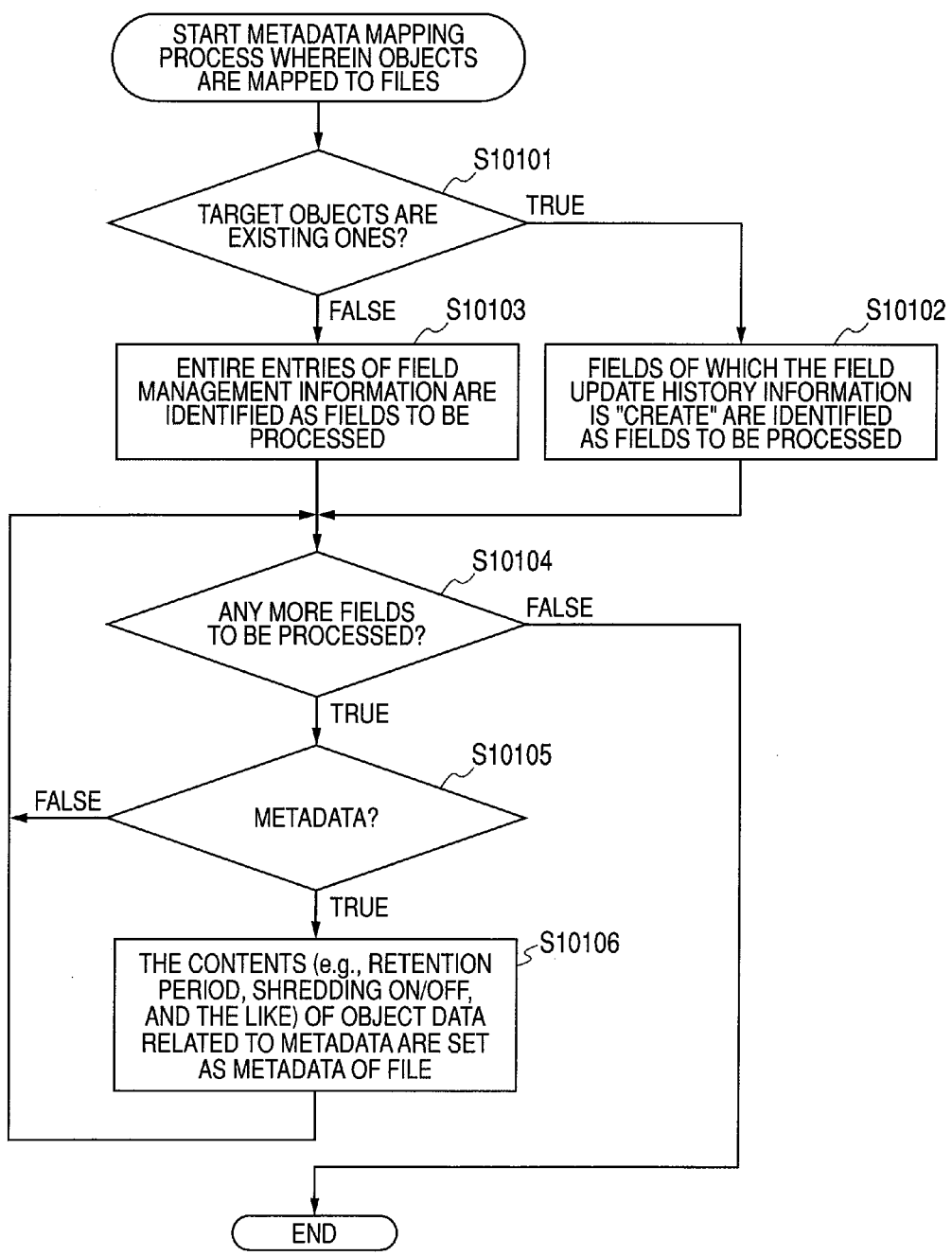
FIG. 14 is a flow chart for explaining a metadata mapping process wherein objects are mapped to files according to the first embodiment of the present invention.

The flow of the metadata mapping process wherein objects are mapped to files, which is invoked at step S3107 of the commit process in FIG. 6B will be described with reference to the flow chart shown in FIG. 14.

First, at step S10101, the object archive control program 7200 makes a determination as to whether or not the target object is an existing one. If it is an existing object (T), the process proceeds to step S10102. If it is a new object (F), the process proceeds to step S10103.

At step S10102, fields of which the update information 1111D in the field update history information 7400 is "Create" are identified as fields to be processed during the present processing flow, and the process proceeds to step S10104.

At step S10103, entire fields of the field management information 7300 for the target object are identified as fields to be processed during the present processing flow.

At step S10104, a determination is made as to whether or not there are any more fields to be processed among the fields identified at step S10102 or step S10103. If there are any more fields to be processed (T), the process proceeds to step S10105. If there are no more fields to be processed, the process ends.

At step S10105, a determination is made as to whether or not the target field is to be preserved as metadata for the archive storage system. If the target field is to be preserved as the metadata (T), the process proceeds to step S10106. If the target file is not to be preserved as the metadata (F), the process returns to step S10104. As an example of a specific determination method, there is a method in which a field is preliminarily designated by the application 1105 in the processing of the object archive library 7100 and the object archive control program 7200 so that the designated field is determined to be the metadata. Moreover, when it is necessary for the archive control program 2201 to edit the metadata for the archive storage system in order to perform the retention period setting process on a file or directory (and a process accompanied thereto of prohibiting alteration and deletion of the file or directory), the field having a field name of "Retention Period" may be determined to be one to which the metadata is written.

At step S10106, the object archive control program 7200 sends a request to the archive control program 2201 to set the content of a predetermined field (e.g., retention period settings, hold settings, shredding on/off, and the like) among the field management information items 7300 in addition to the determined field as the metadata to be provided by the archive storage system for the object. The archive control program 2201 sets the information received from the object archive control program 7200 in the metadata. Then, the process returns to step S10104 for processing of a next field. Moreover, as for the fields stored in the metadata in the present processing flow, it is necessary for the object archive control program 7200 to perform the reading of the content of the fields, described in connection with FIG. 7B, with the source of the reading set to not the file having the field name but the metadata related to the object.

Furthermore, depending on the functions of an archive storage system, there may be other implementation forms other than the form in which the settings of the retention period are implemented as metadata. For example, there may be an implementation form in which a last file access date may be set and referred to as the setting value of the retention period, or an implementation form in which the settings of the retention period are implemented using a special management command. In such cases, with respect to the entire files in which at least the content of fields of an object is preserved, and depending on the setting content of each field, the field list file or the object directory, by collectively setting the retention period based on the content of the "Retention Period" field of the object, it is possible to prevent alteration or deletion of the content data of the object by both an object-based access method via the object archive control program and a file-based access method via the archive control program.

A method of archiving the object data to the file storage according to the present embodiment will be described with reference to a schematic view of FIG. 16 which illustrates a directory structure.

Figure 16A:
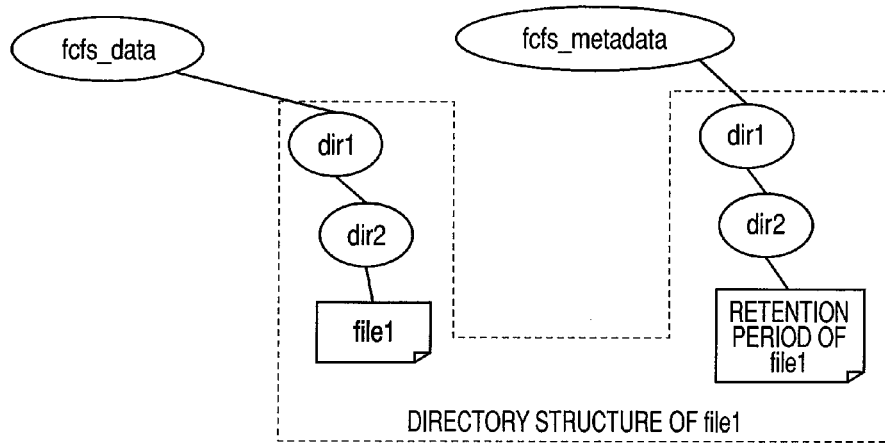
FIG. 16 is an explanatory view of an example state of a file tree according to the first embodiment of the present invention.

With reference to FIG. 16(A), a directory structure before the object shown in FIG. 2 is archived is illustrated in which data is held by the archive storage system 1000. It is assumed that a file having a file name of "file1" is already archived in an interface of a file storage. The directory structure is configured such that a directory named "dir1" is directly under the root, named "fcfs_data," of a directory tree for data storage, another directory named "dir2" is directly under the "dir1," and the "file1" is on the "dir2." In the archive storage system 1000 according to the present embodiment, a directory tree for metadata management is automatically generated independently from the directory tree for data storage. Specifically, directories corresponding to paths beginning from "fcfs_data" are under the root, named "fcfs_metadata," of the directory tree, and "Retention Period of file1" corresponding to the "file1" is maintained as a file. The retention period of the "file1" can be set by writing the retention period in the "Retention Period of file1."

Figure 16B:
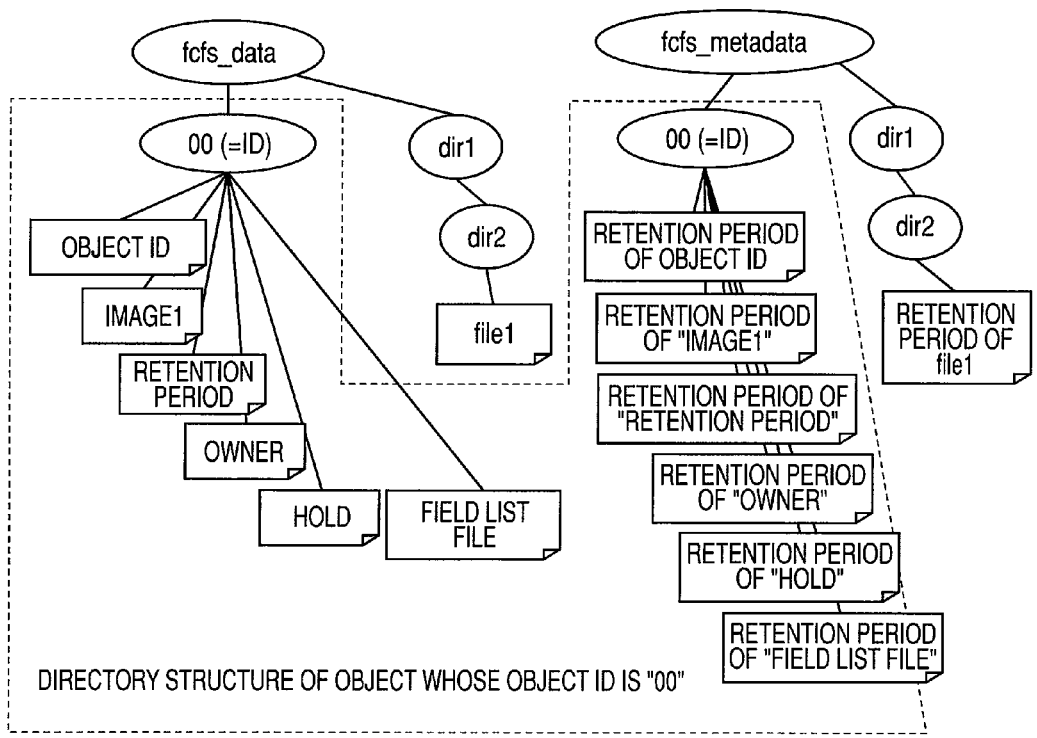

With reference to FIG. 16(B), a directory structure after the object shown in FIG. 2 is archived is illustrated in which data is expanded to files. In this example, it will be described that the object shown in FIG. 2 has been created with an object ID "00." A directory corresponding to the object is created under the root "fcfs_data," and a file of the object ID, a field list file for managing the data of the fields, and a file storing the content of the fields of the object, shown in FIG. 2 are created under the directory. If necessary, the retention period of the files may be set.

Figure 15:
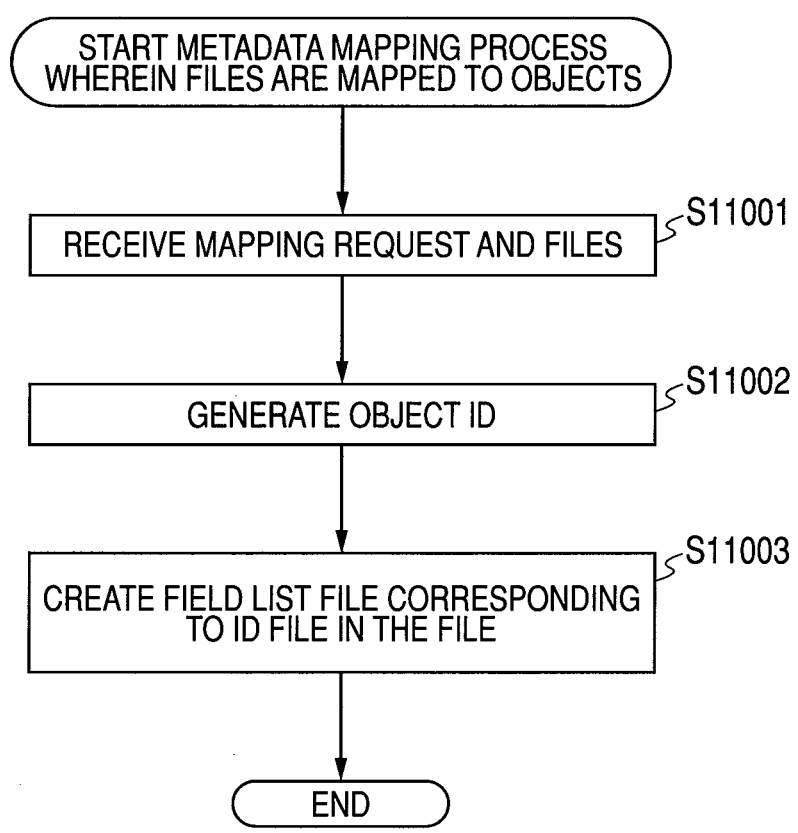
FIG. 15 is a flow chart for explaining a mapping process wherein files are mapped to objects according to the first embodiment of the present invention.

Next, the flow of the mapping process wherein the files created in a file format and stored in the archive storage system are mapped to the object according to the present embodiment will be described with reference to the flow chart shown in FIG. 15.

At step S11001, the object archive control program 7200 receives a request for "File-to-Object Mapping Process" together with the file name of a target file. This request may be instructed from the host and may be instructed from a management computer (not shown). Moreover, the main processing of the instruction may be performed in conjunction with a file storage process to be performed at the time of storing new files to be generated from now on.

Next, at step S11002, an object ID is generated for making an object-based access to a file designated by a file name.

At step S11003, information necessary for the object according to the present embodiment is created using the information of the designated file. Specifically, an Object ID file storing the object ID created at step S11002 is created on the same directory as the target file. Next, the field list file 1112, which has the Object ID file as a field of which the Field Name 1112A is "Object ID," which has the target file as one field, and which has the retention period of the target file as a field of which the Field Name 1112A is "Retention Period," is created on the same directory as the target file. In this way, the process ends.

Figure 13:
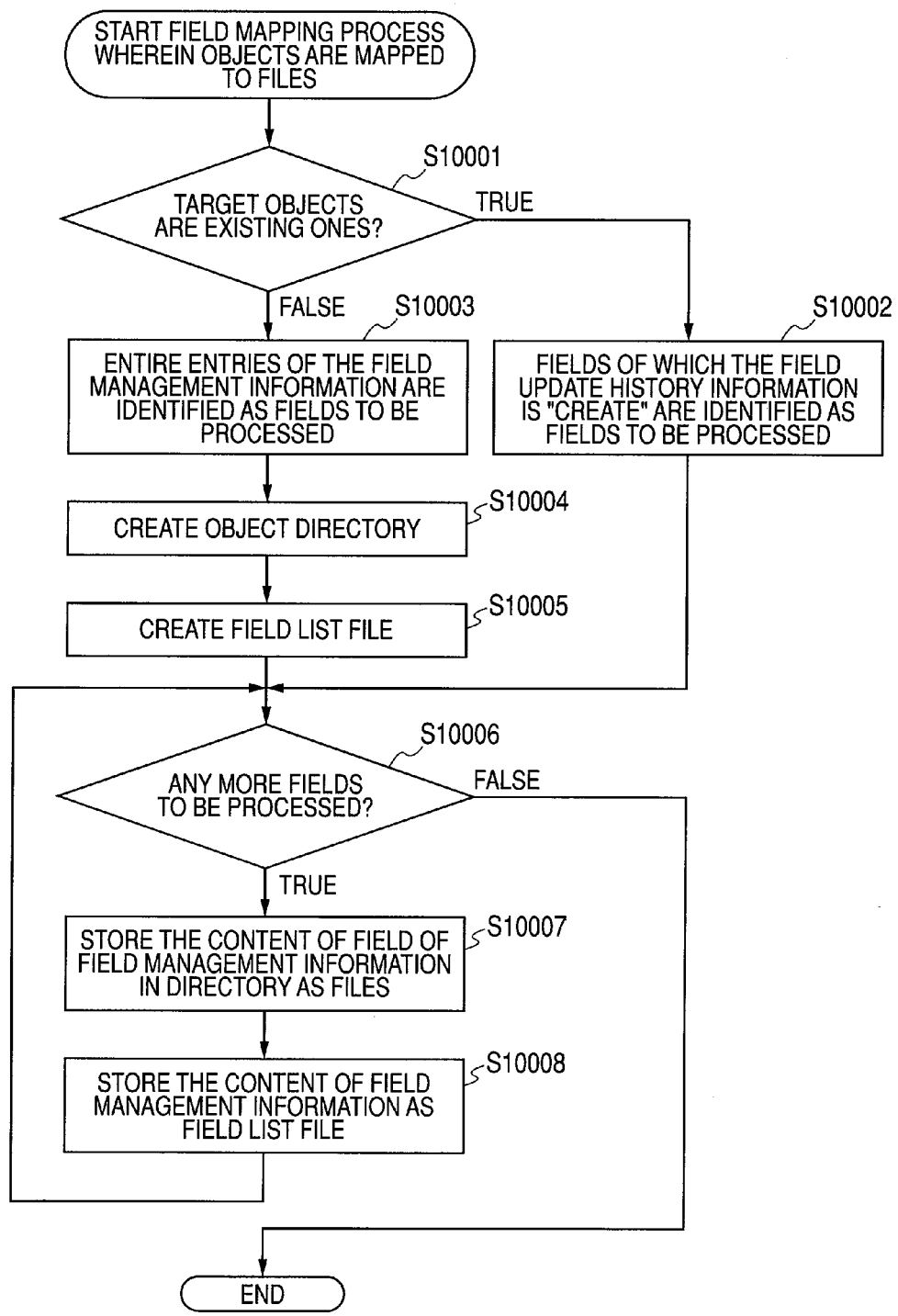
FIG. 13 is a flow chart for explaining a field mapping process wherein objects are mapped to files according to the first embodiment of the present invention.

As the predetermined rule used for generating the directory name of the object directory in the field mapping process wherein fields are mapped to files shown in FIG. 13, the following rules can be used.

(A) A character string in which a character string different from an object ID is added to the beginning or end of the object ID is used as a directory name. The character string may be one in which a predetermined path name is added to the beginning thereof, or may be one in which a character string that can be easily identified as the name of a directory is added. Moreover, the beginning character string may be determined based on the Owner field of an object so that the storage destination of the object can be divided by the owner of the object.

(B) When the character string that is acceptable as the object ID includes a character string that cannot be used as a directory name, the character string is converted. This rule includes limiting the length of the file name or the path name.

(C) The whole object ID is used as the directory name. That is, nothing is converted.

(D) The directory path described in the field is used.

(E) Besides, a function or rule which can derive a unique file name from the object ID is used.

The predetermined rule may be applied to other processes other than the process shown in FIG. 13, capable of identifying the directory name from the object ID.

Moreover, as the predetermined rule used for generating the file name of the file storing the content of the field in the field mapping process wherein objects are mapped to files shown in FIG. 13, the following rules can be used.

(a) A character string in which a character string different from a field name is added to the beginning or end of the field name is used as a file name. The character string may be one in which a predetermined path name is added to the beginning thereof, or may be one in which a character string that can be easily identified as the name of a file is added. Moreover, the beginning character string may be determined based on the Owner field of an object so that the file name shows the owner of the object.

(b) When the character string that is acceptable as the field name includes a character string that cannot be used as a file name, the character string is converted. This rule includes limiting the length of the file name or the path name.

(c) The whole field name is used as the file name. That is, nothing is converted.

(d) Besides, a function or rule which can derive a unique file name from the field name is used.

The predetermined rule may be applied to other processes other than the process shown in FIG. 13, capable of identifying the file name from the field name.

In the first embodiment, as illustrated in FIG. 16(B), the object archive is expanded right under the root directory "fcfs_data." This may be realized such that by the use of the predetermined rule or the like, a path information is preliminarily instructed to the object archive control program 7200, and the object archive control program 7200 expands the object archive right under the path when the "Field Mapping Process Wherein Objects are Mapped to Files" and the "Metadata Mapping Process Wherein Objects are Mapped to Files" are performed. In such a case, when a path "/dir8/dir9" is preliminarily instructed, for example, the object having an object ID of "00" shown in FIG. 16(B) is expanded as a file under "/fcfs_data/dir8/dir9/00."

According to the disclosure of the first embodiment and later-disclosed second and third embodiments, by allowing objects to correspond to directories and fields to correspond to files, objects can be easily located and manipulated in groups, and individual fields can be managed in different ways. An example management includes the following circumstances.

(1) When the archive storage system 1000 has a deduplication function in which two files having the same content are preserved as a single file while virtually being handling as two separate files to thereby reduce required disk capacity, the fields may be handled as different files so that the deduplication function is applied to a specific field.

(2) The objects may be managed by the use of a data management program (e.g., file manager, capacity monitoring program, and copy program) which is designed for files executed in the host. Moreover, the management may be performed in a lump together with file format data.

According to the disclosure of the first embodiment and later-disclosed second and third embodiments, since the internal node device can process the conventional file-based access, by additionally executing the object archive control program 7200 which allows the object ID-based access, it is possible to enable the internal node device to process the object ID-based access while omitting the necessity of reformatting or rearrangement of volumes. Similarly, even when the object archive control program 7200 is invalidated due to a program license status or the like, objects which have been preserved prior to the invalidation can be still continuously referred to and updated.

When the purpose of preserving contents for a long period of time and a stable manner (that is, without falsification and data loss) is considered, a variety of events may occur such as a generational change in the archive storage, a change of the archive storage from CAS to NAS or from NAS to CAS, a generational change in the application referring the contents, or an extinction of the application itself in response to a change in social conditions. Under such circumstances, the storage made by the first to third embodiments can be still accessed and continuously remain available.

Moreover, in a case where the storage migrates from CAS to NAS, for example, when the archive storage system according to the first to third embodiments is installed at either one of a migration source or a migration destination, the contents occupying a huge storage capacity for long-term preservation can be accessed in the course of the migration by using the same access method in both the migration source storage and the migration destination storage. Therefore, the access needs not wait until the migration is completed Furthermore, in the first embodiment, the processing (object archive control program 7200) necessary for conversion from the object ID-based access to the file-based access and temporary data, such as the field management information 7300, created during generation or editing are managed within the archive storage system 1000 or the internal node device 2000. Therefore, by allowing the archive storage system or the internal node device to provide a state or packaging where security is physically ensured, the present configuration can prevent unauthorized manipulation of objects and files caused by unauthorized alteration of the object archive control program and the field management information.

Furthermore, the present embodiment provides flexibility that allows implementations without necessity of preparing a separate device necessary for conversion.

Embodiment 2

Figure 18:
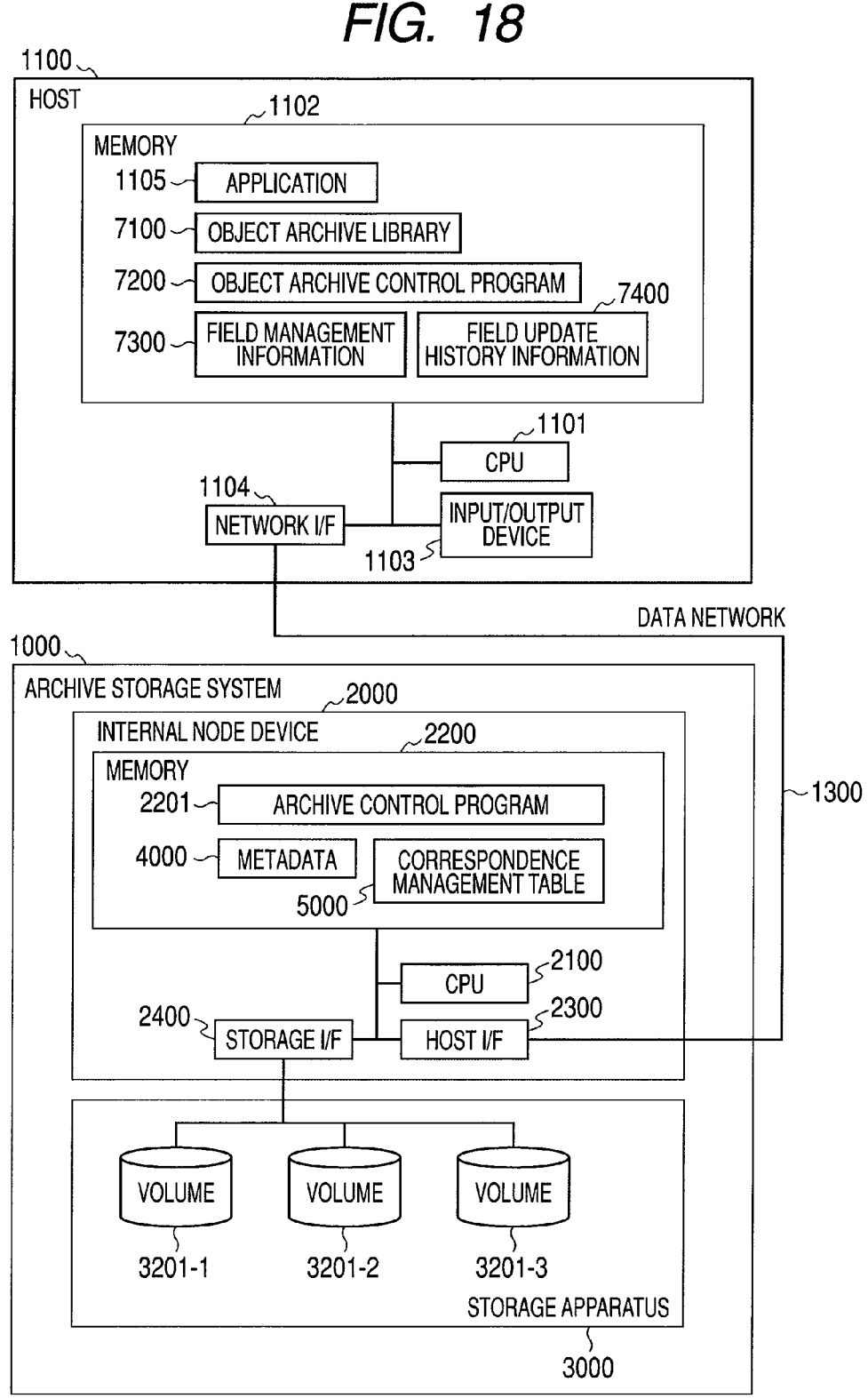
FIG. 18 is a block diagram showing a configuration of a computer system according to a second embodiment of the present invention.

Next, a second embodiment of the present invention will be described with reference to FIG. 18. Since the second embodiment is the same as the first embodiment except the later-described differences, the content disclosed in the first embodiment may be arbitrarily combined with the content disclosed in the second embodiment.

The host 1100 includes the object archive control program 7200, the field management information 7300, and the field update history information 7400. Owing to this configuration, the conversion from the object-based access to the file-based access is performed in the host 1100. Moreover, the field management information 7300 and the field update history information 7400 may be preserved other storage area (e.g., an internal HDD) other than the memory 1102 of the host 1100.

In the second embodiment, since the conversion is performed in the host 1100 and data under editing is temporarily preserved in the field management information 7300 present in the host 1100, the changes made on the fields in the course of the editing according to the present embodiment (that is, between the object create request process and the commit request process, or between the object edit request process and the commit request process) are not transmitted to the archive storage system 1000. Moreover, as for the target objects of the object edit request process, the host 1100 can initiatively process the referencing of the content of fields under editing. Therefore, the second embodiment can reduce the load of the archive storage system 1000.

Moreover, when the second embodiment is seen from a different viewpoint, since functionality expansion is not required for the archive storage system 1000 (in this case, only values necessary for generating the object IDs may be managed in the archive storage system), a flexible operation is possible.

Furthermore, the present embodiment provides flexibility that allows implementations without necessity of preparing a separate device necessary for conversion.

Embodiment 3

Figure 19:
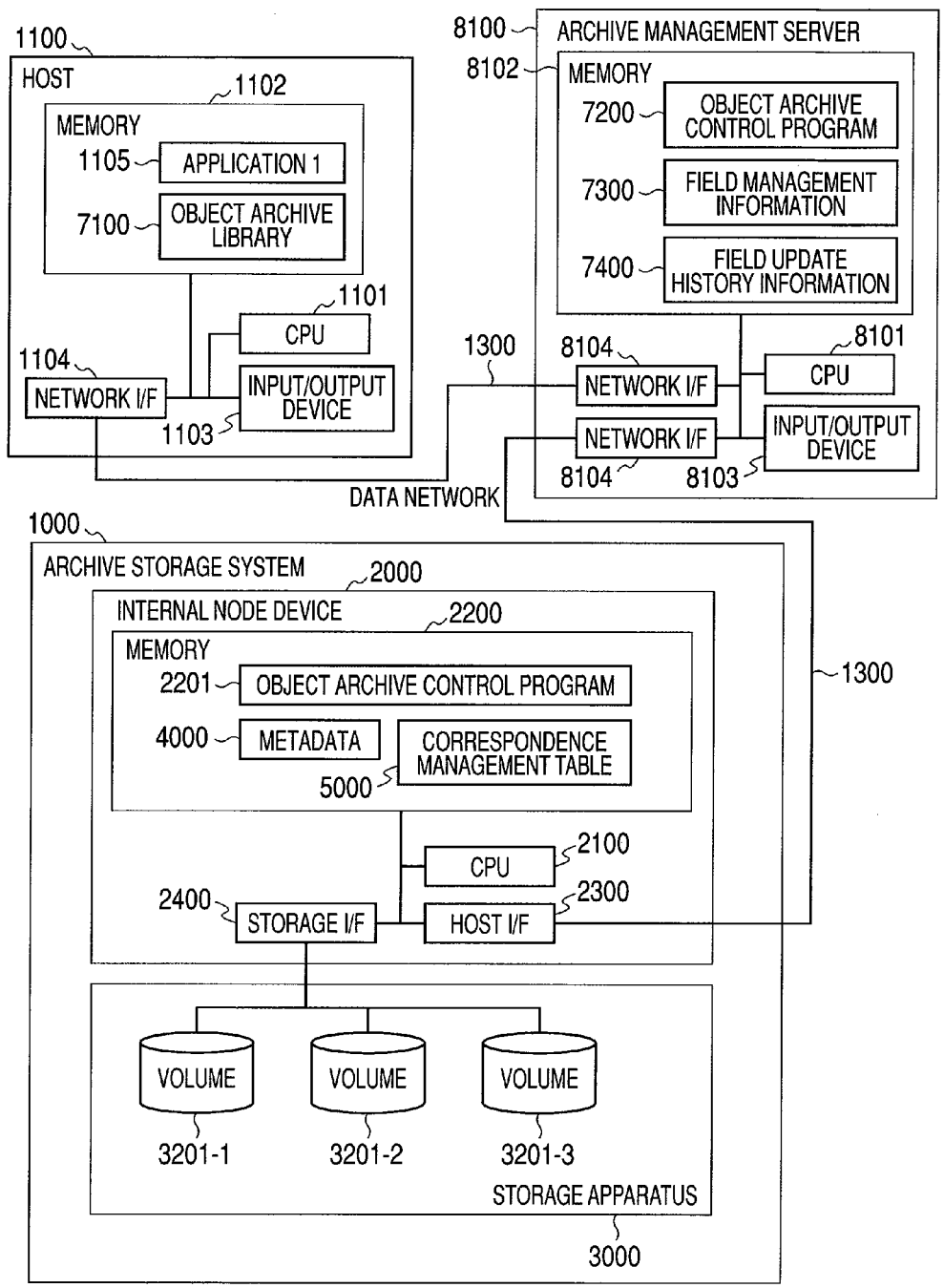
FIG. 19 is a block diagram showing a configuration of a computer system according to a third embodiment of the present invention.

Next, a third embodiment of the present invention will be described with reference to FIG. 19. Since the third embodiment is the same as the first embodiment except the later-described differences, the content disclosed in the first embodiment may be arbitrarily combined with the content disclosed in the third embodiment.

An archive management server 8100 includes the object archive control program 7200, the field management information 7300, and the field update history information 7400. Owing to this configuration, the conversion from the object-based access to the file-based access is performed in the archive management server 8100. Moreover, the field management information 7300 and the field update history information 7400 may be preserved other storage area (e.g., an internal HDD) other than a memory 8102 of the archive management server 8100.

In the third embodiment, since the conversion is performed in the archive management server 8100 and data under editing is temporarily preserved in the field management information 7300 present in the archive management server 8100, the changes made on the fields in the course of the editing according to the present embodiment (that is, between the object create request process and the commit request process, or between the object edit request process and the commit request process) are not transmitted to the archive storage system 1000. Moreover, as for the target objects of the object edit request process, the archive management server 8100 can initiatively process the referencing of the content of fields under editing. Therefore, the third embodiment can reduce the load of the archive storage system 1000.

Moreover, when the third embodiment is seen from a different viewpoint, since functionality expansion is not required for the archive storage system 1000 (in this case, only values necessary for generating the object IDs may be managed in the archive storage system), and any special area for temporarily storing the field management information 7300 is not required for the host 1100, a flexible operation is possible.

What is claimed is:

1. A non-transitory computer-readable medium for an apparatus, comprising:
  a code causing the apparatus to receive a first request to store a content object which includes:
    (A1) a first field including a content data generated by an processing of an application program executed in a first computer, and
    (A2) a second field including attribute information of the content data;
  a code causing the apparatus to generate:

(B1) an object identifier corresponding to the content object,
(B2) a first directory name corresponding to the object identifier in accordance with a predetermined rule,
(B3) a first file name corresponding to the first field, in accordance with the predetermined rule, and
(B4) a second file name corresponding to the second field, in accordance with the predetermined rule;
a code causing the apparatus to send a second request to a file storage for creating:
(C1) a directory assigned the first directory name,
(C2) a first file assigned the first file name,
(C3) a second file which is assigned the second file name, and in which the attribute information of the second field is included, and
(C4) a field list file in the directory related to the content object, wherein the field list file includes a correspondence between the first field and the first file name and a correspondence between the second field and the second file name;
a code causing the apparatus to send the object identifier to the first computer for the application program to designate the content data;
a code causing the apparatus to receive a third request designating the object identifier for editing the content object;
a code causing the apparatus to specify the first directory name and the field list file, based on the third request and the predetermined rule; and
a code causing the apparatus to send an edited data of the content object to the file storage, for updating the first file or the second file,
wherein the apparatus is the first computer, the file storage, or a second computer coupled to the first computer and the file storage.

2. A non-transitory computer-readable medium according to claim 1, wherein the predetermined rule includes:
a rule defining the first directory name is the object identifier; and
a rule defining the second file name is a field name assigned the attribute information and identifying the second field.

3. A non-transitory computer-readable medium according to claim 2, wherein the first request includes (A3) a third field including another attribute information of the content data,
wherein the medium further comprises:
a code causing the apparatus to generate (B5) a third file name corresponding to the third field, in accordance with the predetermined rule; and
a code causing the apparatus to send a fourth request with sending the second request to the file storage for creating (C5) a third file which is assigned the third file name, and in which the another attribute information is included.

4. An apparatus comprising:
a memory storing an object management program; and
a CPU executing the object management program,
wherein according to execution of the object management program, the CPU:
receives a first request to store a content object which includes:
(A1) a first field including a content data generated by an processing of an application program executed in a first computer, and
(A2) a second field including attribute information of the content data generates:
(B1) an object identifier corresponding to the content object,
(B2) a first directory name corresponding to the object identifier in accordance with a predetermined rule,
(B3) a first file name corresponding to the first field, in accordance with the predetermined rule, and
(B4) a second file name corresponding to the second field, in accordance with the predetermined rule;
sends a second request to a file storage for creating:
(C1) a directory assigned the first directory name,
(C2) a first file assigned the first file name,
(C3) a second file which is assigned the second file name, and in which the attribute information of the second field is included, and
(C4) a field list file in the directory related to the content object, wherein the field list file includes a correspondence between the first field and the first file name and a correspondence between the second field and the second file name;
sends the object identifier to the first computer for the application program to designate the content data;
receives a third request designating the object identifier for editing the content object;
specifies the first directory name and the field list file, based on the third request and the predetermined rule; and
sends an edited data of the content object to the file storage, for updating the first file or the second file,
wherein the apparatus is the first computer, the file storage, or a second computer coupled to the first computer and the file storage.

5. An apparatus according to claim 4, wherein the predetermined rule includes:
a rule defining the first directory name is the object identifier; and
a rule defining the second file name is a field name assigned the attribute information and identifying the second field.

6. An apparatus according to claim 5, wherein the first request includes (A3) a third field including another attribute information of the content data,
wherein the CPU:
generates (B5) a third file name corresponding to the third field, in accordance with the predetermined rule; and
sends a fourth request with sending the second request to the file storage for creating (C5) a third file which is assigned the third file name, and in which the another attribute information is included.

* * * * *